US005978648A

United States Patent [19]
George et al.

[11] Patent Number: 5,978,648
[45] Date of Patent: Nov. 2, 1999

[54] INTERACTIVE MULTIMEDIA PERFORMANCE ASSESSMENT SYSTEM AND PROCESS FOR USE BY STUDENTS, EDUCATORS AND ADMINISTRATORS

[75] Inventors: Tomy George, Auburn Hills; Sriram V. Bhamidipati, Farmington Hills, both of Mich.

[73] Assignee: Forte Systems, Inc., Troy, Mich.

[21] Appl. No.: 08/812,488

[22] Filed: Mar. 6, 1997

[51] Int. Cl.⁶ ...................................................... G09B 7/00
[52] U.S. Cl. .......................... 434/362; 434/118; 434/350; 434/322
[58] Field of Search .................... 434/362, 118, 434/322, 327, 350

[56] References Cited

U.S. PATENT DOCUMENTS

| | | | |
|---|---|---|---|
| H1452 | 6/1995 | Kennedy | 434/322 |
| Re. 36,028 | 1/1999 | Deesen et al. | 434/327 |
| 4,622,013 | 11/1986 | Cerchio | 434/118 |
| 5,002,491 | 3/1991 | Abrahamson et al. | 434/322 |
| 5,176,520 | 1/1993 | Hamilton | 434/350 |
| 5,267,865 | 12/1993 | Lee et al. | |
| 5,410,634 | 4/1995 | Li | |
| 5,441,415 | 8/1995 | Lee et al. | |
| 5,537,141 | 7/1996 | Harper et al. | 348/12 |
| 5,601,432 | 2/1997 | Bergman | 434/118 |
| 5,616,033 | 4/1997 | Kerwin | 434/118 |
| 5,618,182 | 4/1997 | Thomas | 434/323 |
| 5,743,746 | 4/1998 | Ho et al. | 434/332 |
| 5,748,921 | 5/1998 | Lambrecht et al. | 395/308 |
| 5,810,599 | 9/1998 | Bishop | 434/157 |
| 5,823,788 | 10/1998 | Lemelson et al. | 434/350 |
| 5,827,070 | 10/1998 | Kersha et al. | 434/322 |
| 5,833,468 | 11/1998 | Guy et al. | 434/350 |

*Primary Examiner*—Jessica J. Harrison
*Assistant Examiner*—David Fleming
*Attorney, Agent, or Firm*—Gifford, Krass, Groh, Sprinkle, Anderson & Citkowski, P.C.

[57] ABSTRACT

An interactive multi media performance assessment system and process for use by students for creating multi media presentations based upon the task assignments generated by a teacher and utilizing any combination of text, audio and visual input sources. A series of workfolders are created by the student to view the issued task assignments and provide a vehicle for creating the multi media presentations. Resources such as Internet based connection and various audio visual items may be utilized with the system for assisting in the creation of the presentations and both the teachers and students may provide feedback in the form of text, audio or video. Additionally, administrators can provide feedback to teachers which in turn can be utilized for evaluation and suggested improvements.

19 Claims, 42 Drawing Sheets

TASK DETAILS

TASK TITLE: NATIONAL ISSUE--SUMM. ASSESSMENT    12/15/1996   -   01/09/1997

SUBJECT:    SOCIAL STUDIES/LANGUAGE ARTS     ASSESSMENT     SUMMATIVE

GRADE:     EIGHT

DESCRIPTION:

YOU ARE A NEWS ANALYST FOR A NATIONAL NEWS SERVICE. YOU ARE PREPARING A PROGRAM ON A CURRENT NATIONAL ISSUE THAT WILL REQUIRE POLITICAL ACTION. YOU MUST INVESTIGATE FOUR EVENTS IN U.S. HISTORY THAT ARE RELATED TO YOUR ISSUE. YOUR RESEARCH MUST FOCUS ON EVENTS AFTER 1850. AS A NEWS ANALYST, YOU MUST EXPLAIN THE SIGNIFICANCE OF THE HISTORICAL EVENTS AND RELATE THEM TO THE CURRENT ISSUE. YOU WILL THEN RECOMMEND A COURSE OF ACTION ON THE CURRENT ISSUE IN A COMMENTARY, COVER STORY, OR POLITICAL OPINION PIECE.

STUDENT ACTIVITY

1. SELECT A CURRENT ISSUE THAT WILL REQUIRE NATIONAL ACTION AND APPROVE IT WITH YOUR SOCIAL STUDIES TEACHER.

2. RESEARCH ONE CURRENT AND THREE HISTORIC EVENTS THAT DEAL WITH THE SAME ISSUE IN U.S. HISTORY. IN YOUR RESEARCH YOU NEED TO EXAMINE THE ECONOMIC, POLITICAL, AND SOCIAL ASPECTS RELATED TO YOUR ISSUE.

BENEFITS

STUDENT IS GIVEN A CHOICE OF HISTORICAL EVENTS THAT ARE OF INTEREST.

STUDENT IS ABLE TO EXPLORE AREAS OF HISTORY THAT ARE POINTS OF CURIOSITY AND INTEREST.

STUDENT IS GIVEN OPPORTUNITY TO EXPRESS PERSONAL OPINIONS AND PERSPECTIVES.

FIG - 41

INTERACTIVE MULTIMEDIA PERFORMANCE ASSESSMENT SYSTEM AND PROCESS FOR USE BY STUDENTS, EDUCATORS AND ADMINISTRATORS

BACKGROUND OF THE INVENTION

1. Field of the Invention

The present invention relates generally to educational assistance tools and processes and, more specifically, to an interactive multimedia performance assessment system and process for use by students, educators and administrators for facilitating individualized performance and assessment of a student's academic development by permitting the student to prepare multi-media presentations which are demonstrative of classroom learning as well as providing a motivating vehicle for assisting the student in academic and educational development.

2. Description of the Prior Art

The prior art is well documented with various different types of systems and methods for facilitating the educational development of students. As is well known, the most traditional style of educating involves the use of grades and standardized test scores for representing each student's performance to parents, universities and potential employers. The basis for such teaching systems remains the teacher or professor who lectures to a group of students in conjunction with text material. Homework is assigned to reinforce the lessons taught in class and traditionally has been administered to measure a student's aptitude and ability to retain material.

In an attempt to improve upon the underlying concept of standardized teaching methods, certain interactive computer aided systems have been employed to assist the teacher in minimizing the repetitive tasks of preparing daily lectures, preparing and grading homework and documenting the individualized progress of each student. Example of such systems are set forth in U.S. Pat. Nos. 5,267,865 and 5,441,415, both issued to Lee et al., which disclose educational methods and systems employing multimedia technology and including a plurality of student workstations which are connected, via a common LAN interface to a teacher's workstation. The teacher has the capability of selecting courseware specific to a given subject which is then transmitted to the individual student workstations and which is then responded to by having the students key enter answers to questions which are posed in the presentation and which may be graded and evaluated in a more efficient manner.

While disclosing useful interactive systems, the systems of Lee et al. are intended to only improve upon the efficiency of existing teaching methods and to theoretically reduce the effort necessary by the teacher in administering to larger groups of students. A major shortcoming of the traditional educational system, not addressed by the interactive systems of Lee et al., is that it does not do a very good job of subjectively and effectively analyzing a student's actual performance apart from traditional grading and standardized test scoring. A large part of this shortcoming is the inability of such standardized teaching methods and systems to permit the student to demonstrate his or her knowledge obtained in the course of classroom learning in some form of useful and creative outlet. The traditional methods of education, improved upon by Lee, rather are directed to more or less evaluating a given student within an overall group and without effectively examining and analyzing their respective strengths and weaknesses.

SUMMARY OF THE PRESENT INVENTION

The present invention is an educational system and process for an interactive multi media performance assessment tool which is for use with an interactive audio visual system and which assists a student in the preparation of multi-media presentations which are demonstrative of classroom learning. The performance assessment tool of the present invention permits teachers and administrators to link curriculum goals to instruction, assessment and student performance.

Teachers create a series of performance assessment tasks which are designed to access a student's entry level knowledge or application of knowledge in a given subject matter and covering a specified time frame. Incorporated into the performance assessment tasks are exemplars which are models of exemplary achievement for students to emulate in their own progress and rubrics which are sets of scoring guidelines to be followed in the evaluation of a student's work. Also incorporated into the assessment tool system are course or curriculum goals which are established for a particular subject or course and broader district goals which are established by a school/district/state for all grades.

The assessment tasks are assigned digitally to the students on their computers for completion either at school or at home. The student in turn completes the assigned tasks through the creation of a number of work folders for each of the assigned tasks. The work folders provide the student numerous multi media tools such as Internet access, word processing and paint programs, digital scanner, video camera and camcorder devices and audio recorders to assist the student in creating multi media presentations. The teacher assessment tasks and student workfolders are designed so that they are truly interactive and allow both the teacher and student to also communicate and to provide information using any combination of text, audio and video from the selection of interactive media previously described.

The multi media projects can be reviewed by parents, teachers and student administrators and may further be self-evaluated by the students. The students are further provided with the ability to compile their best work onto a CD-Rom or similar computer writeable media as a true creative demonstration of what they have learned. The objective of the performance assessment system and method of this invention is to provide a tool for assessing each student's performance in academics, athletics and extra curricular activities and which supplements the more traditional approaches to learning which otherwise do not adequately subjectively assess a student's actual performance.

The present invention further contemplates a computer readable media embodying a computer code for use with the interactive media and according to the performance assessment system and process of the present invention. The media is in the preferred format a CD-ROM disk but may also be a floppy diskette or either type of writeable media, including a computer hard drive. The assessment system and process of the invention is provided in a software program format which may be loaded into any Microsoft Windows or Macintosh operating program.

BRIEF DESCRIPTION OF THE DRAWINGS

Reference will now be had to the attached drawings, when read in combination with the following specification, wherein like reference numerals refer to like parts throughout the several views, and in which:

FIG. 4a is an illustration of descriptive screen of a selected task template screen showing the usage of the template screen;

FIG. 12e is an illustration of a personal information administration screen;

FIG. 15 is an illustration of a teacher administration screen;

FIG. 16 is an illustration of a student administration screen;

FIG. 41 is an illustration of a task details screen;

DESCRIPTION OF THE PREFERRED EMBODIMENTS

With reference to the following specification, the present invention discloses an interactive multi media performance assessment system and process for use by students, educators and administrators for analyzing a student's actual educational performance in addition to grading and other forms of standardized test scoring. As will be subsequently described, the present invention most notably provides the student with the ability to receive a performance task assignment from the instructor and to create a multi media presentation drawing from a number of different textual, audio and video sources, most notable among them being on-site Internet connection.

Figure 1:
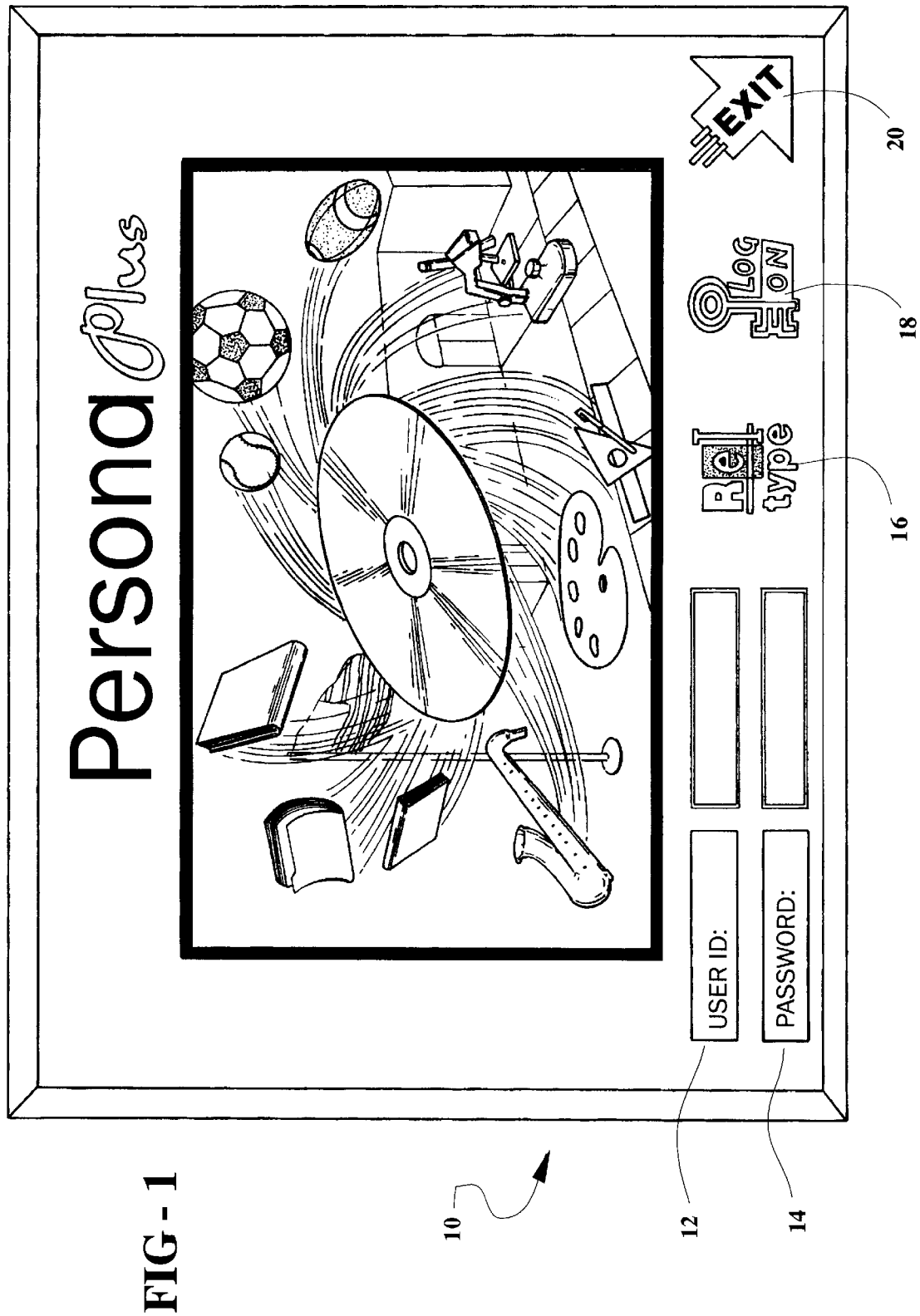
FIG. 1 is an illustration of an initial log on screen according to a desired embodiment of the interactive multi media performance assessment system and process according to the present invention.

With reference to FIG. 1, a logon screen 10 is illustrated for a computer writeable medium employing a computer code according to a preferred embodiment of the present invention. In the preferred embodiment, the multi media system and process is provided on a computerized software program which may be stored either in a personal computer hard drive or a CD Rom or floppy disk medium and which is capable of being retrieved and worked upon by the personal computer. The multi media system and process is designed to cooperate with any standard program operating system, such systems typically being either a Microsoft Windows or Macintosh operating platform.

The various logon screens illustrated in FIGS. 1–21, beginning with logon screen 10, illustrate one preferred screen format for a logical progression of the interactive multi media performance assessment system and process according to the present invention. However it is understood that the underlying concept of the present invention is not dependent upon one specific type or style of writeable medium, that which is shown only being considered a given preferred manner for its presentation.

Referring again to FIG. 1, the logon screen 10 includes a desired illustrative display and a user identification key entry 12 and password entry 14 for permitting entry to only subscribers of the service. A retype button 16 is provided if it necessary to repeat the key entry sequence and a logon button 18 to proceed to the next screen once the necessary identification information has been inputted. Finally, an exit button 20 is provided to exit the system.

Figure 2:
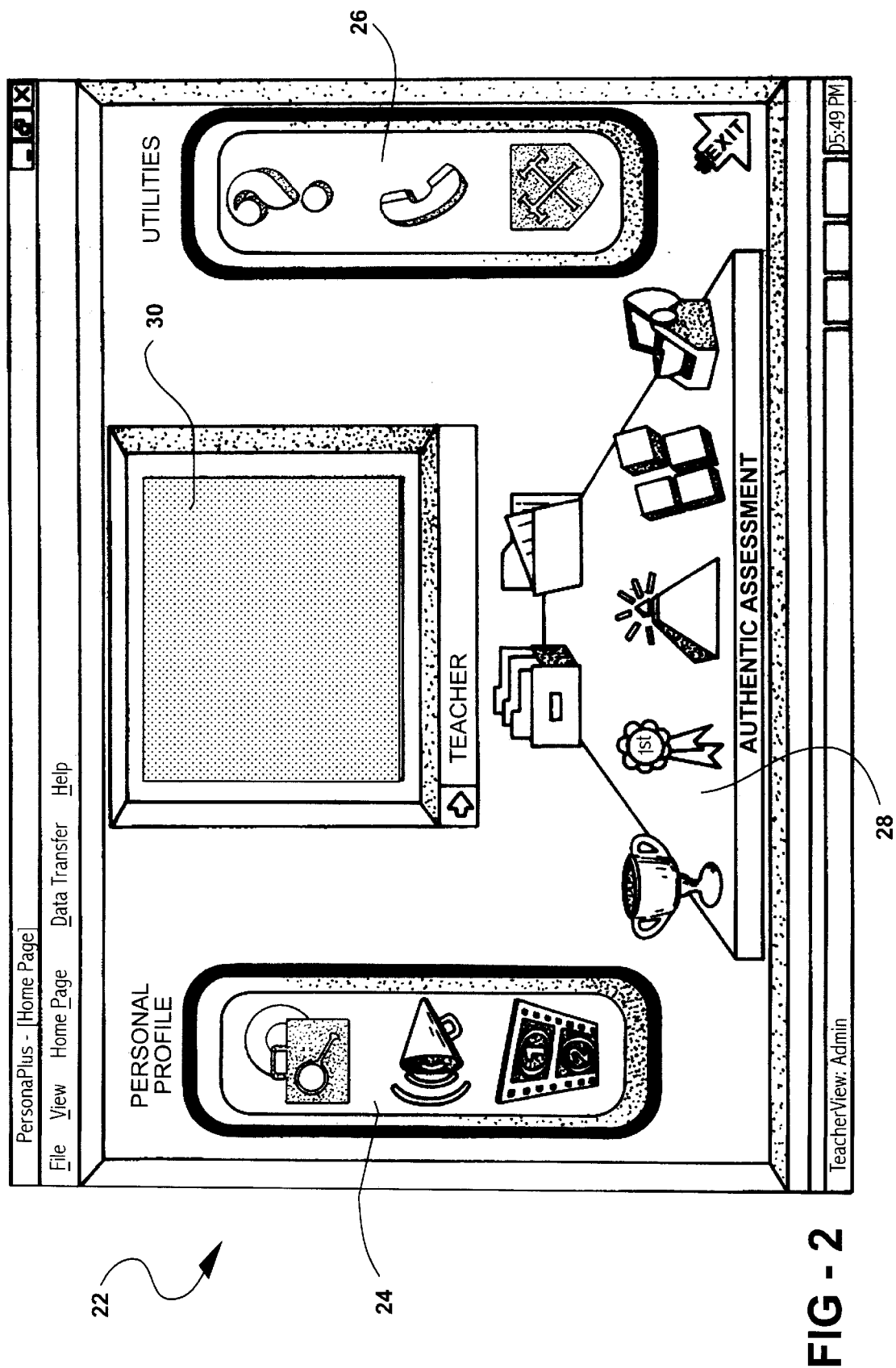
FIG. 2 is an illustration of a teachers home page screen.

Referring to FIG. 2, a teacher's home page screen 22 is illustrated which is accessible from the home page logon screen 10. The teachers home screen 22 provides an assortment of menu options for performing a variety of different functions such as producing performance task developer screens and task template screens among others. A personal profile tool bar 24 is provided to enable the user to access textual, audio and video profile materials and a utilities tool bar 26 provides access to desired input sources, including Internet connection. A table top menu display 28 provides the basis for accessing performance task developer and template screens and additionally permits the teacher or instructor to communicate with school administration officials in addition to the students. The menu display includes a plurality of icons which permit the user to access all functional features and areas of the system, perform administrative functions, connect to any multi media input, as will be subsequently described. Finally, a window 30 may be incorporated into the screen 22 to display a photograph of the selected individual, such as a teacher or student, and provides a personalized aspect of the system according to the present invention.

Figure 2A:
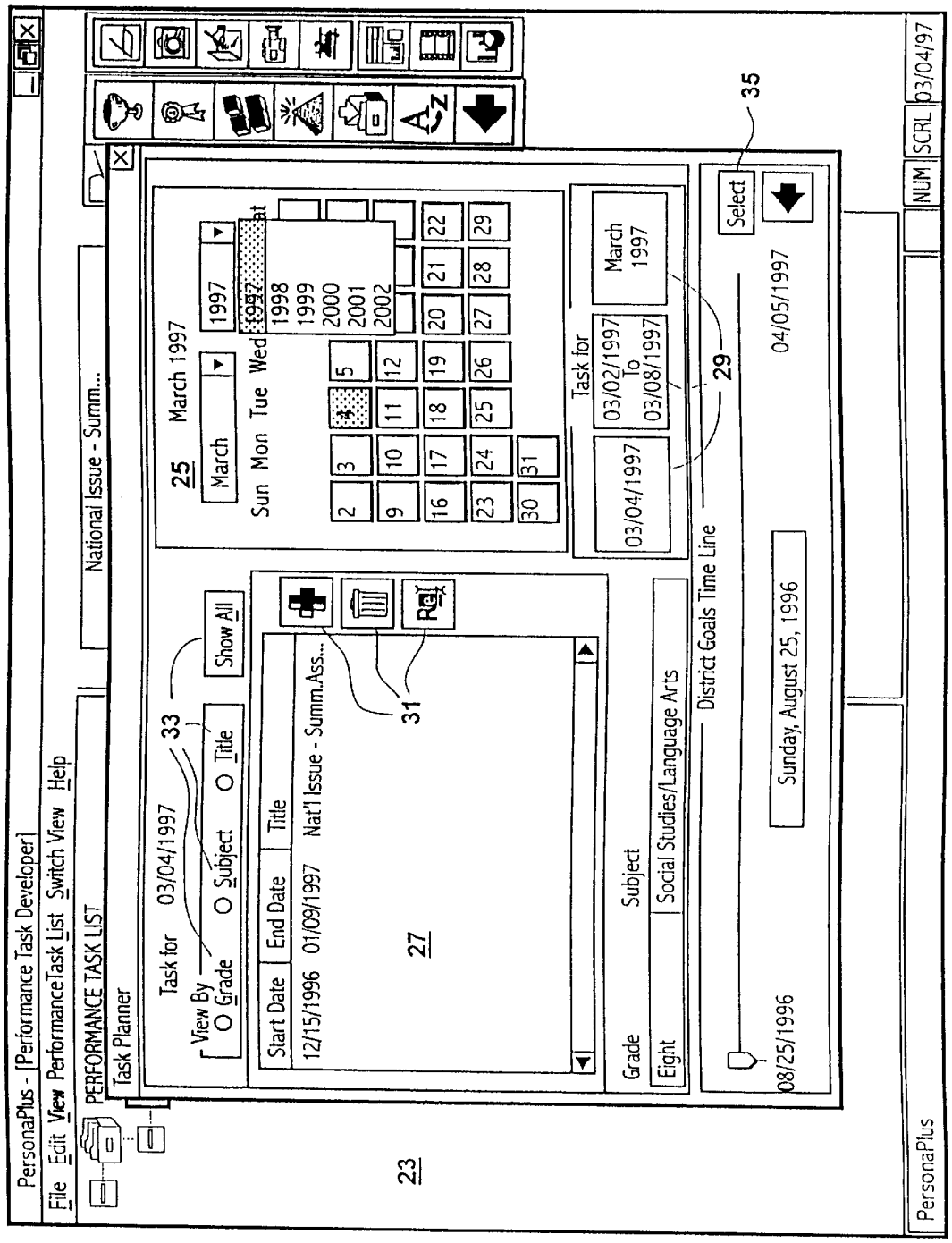
FIG. 2a is an illustration of a teacher/administrator task planner screen.
Figure 2B:
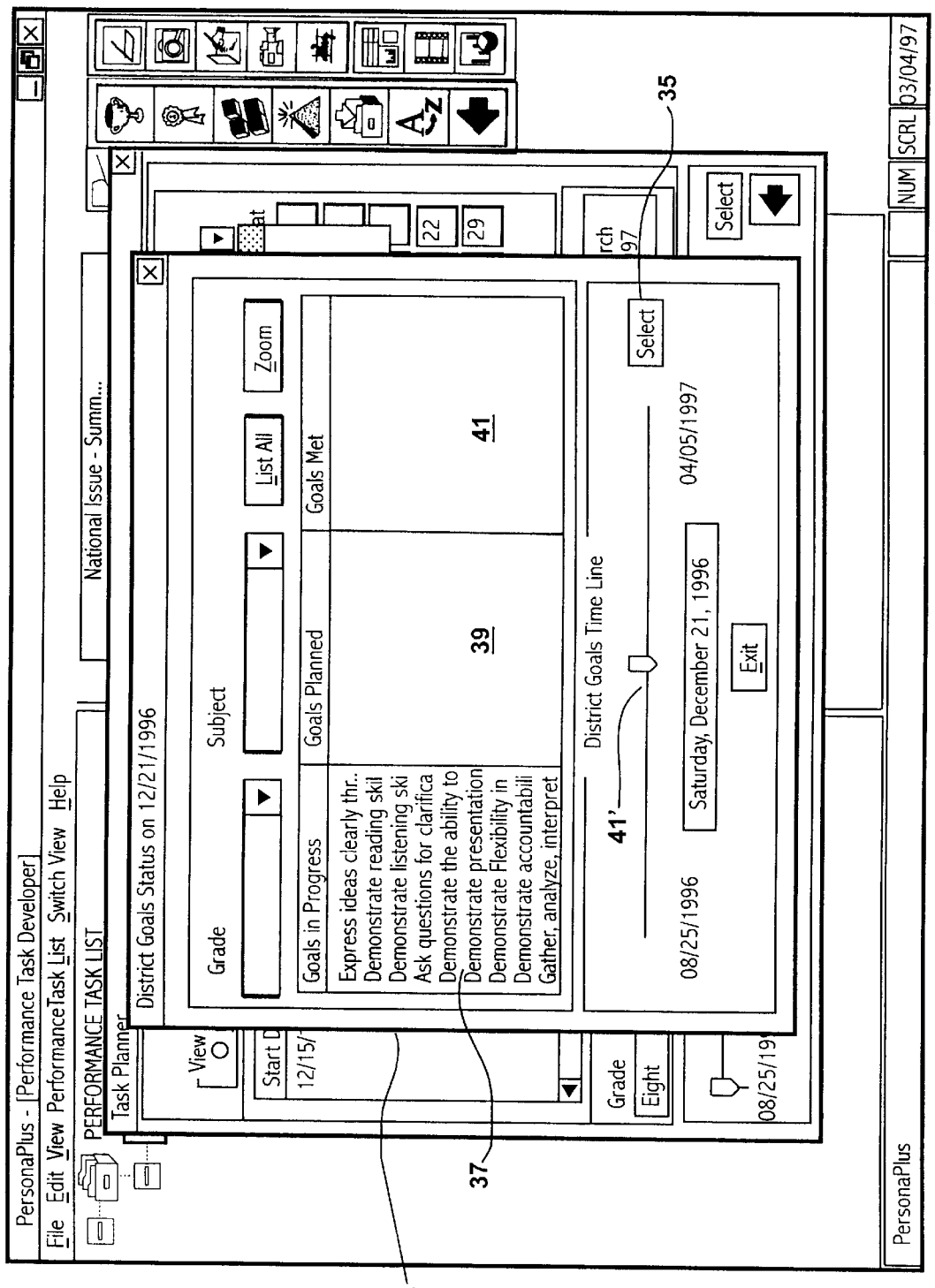
FIG. 2b is an illustration of a goals status screen for an academic year used by teachers and administrators for planning.

Referring now to FIGS. 2a and 2b, a pair of screens 23 and 24 are illustrated for assisting the instructor and administrator. In FIG. 2a, the screen 23 shows an instructional task planner for viewing and maintaining tasks for an academic year for a given date, week or month by a grade or subject. Included in the screen 23 is a calendar portion 25 and a task list portion 27. Additional features as are evident from the screen include day, week and month indicators 29, add, modify and delete buttons 31 and grade, subject, title and show all buttons 33 and further shows an icon button 35 for viewing the goals status screen 24 for a specific day.

In FIG. 2b, the screen 24 illustrates a plurality of individual portions for showing such things as goals in progress portion 37, goals planned portion 39 and goals met portion 41 for a given grade and/or subject on a given date in an academic year. A selection bar 41' is shown along a bottom of the screen 24 and permits a teacher or administrator to select a given date for viewing the contents of the screen 24.

Figure 3:
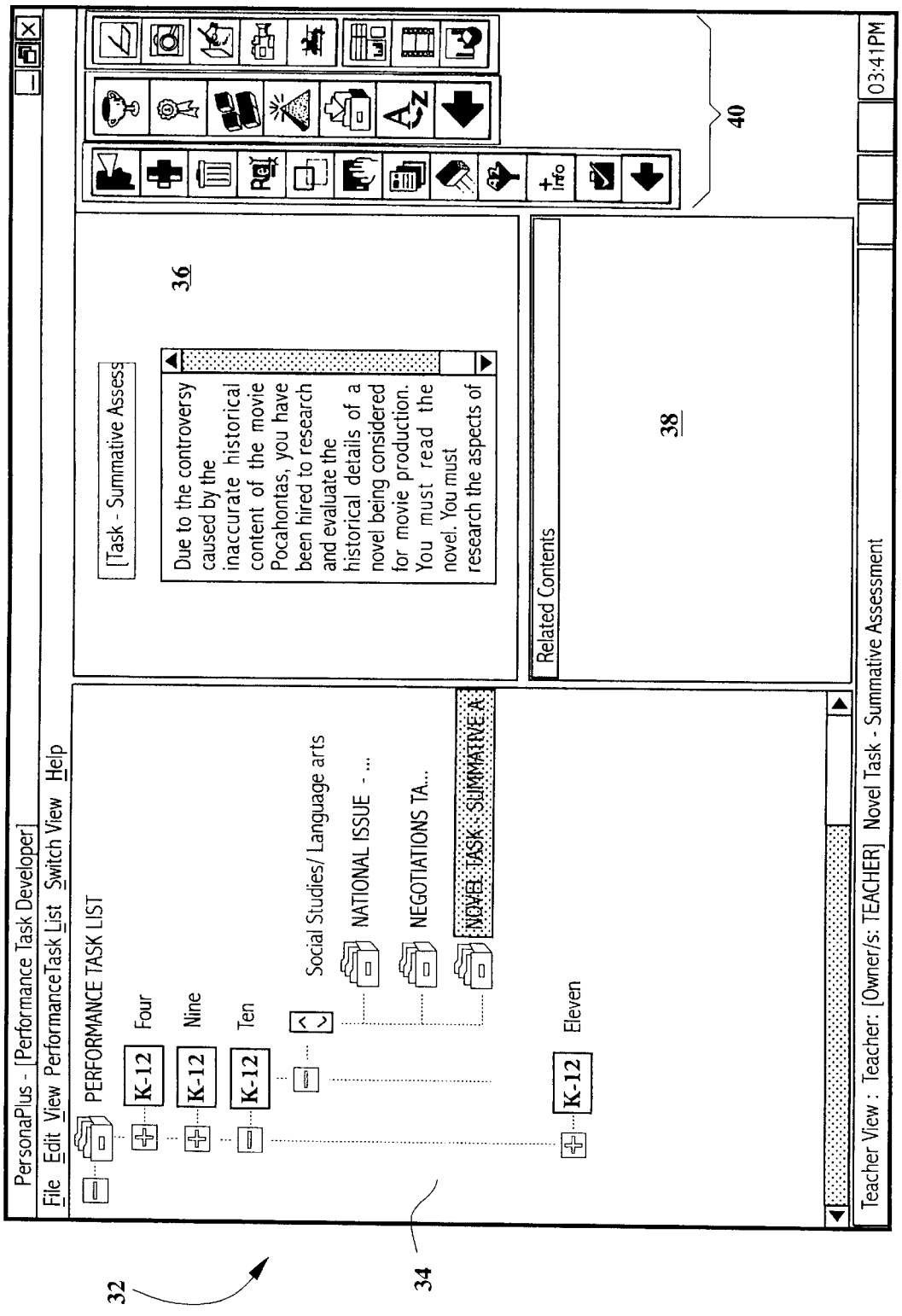
FIG. 3 is an illustration of a teacher's performance task developer screen for preparing a digitally transmittable student assignment.

Referring to FIG. 3, a performance task screen 32 is illustrated according to the present invention and is accessed by clicking on the appropriate item in the table top menu display 28. As is clearly illustrated, the performance task developer screen 32, as with all of the task screens illustrated throughout the drawings, is presented in a Microsoft Windows 95 operating platform. However it is again understood that any suitable operating platform (Macintosh, etc.,) may be employed without deviating from the scope of the invention.

The performance task screen 32 is split into three main portions, a generated task list 34, a detail task portion 36 and a related contents task portion 38. The performance task list 34 includes a listing of all the academic subjects for grades kindergarten through twelfth, such a listing typically including writing, math, science, interdisciplinary projects, foreign language, business, theatre, cooperative learning, journalism, art music and sports. The detail task portion 36 illustrates an assignment for a subject selected from the task list portion 34 and any related contents relative to the designated subject are listed in portion 38.

A multi-function tool bar 40 is also positioned in three vertical rows at the far right of the performance task screen 32 and employs a selected variation of functioning icons for permitting a user to operate the computer writeable media and interactive system according to the invention. The contents of the tool bar 40 are discussed in specific detail with reference to FIGS. 31 and 33–35 and specifically permit a user to access the various functions incorporated into the system of the invention, as well as accessing certain available multi media tools for the creation of presentations, as will also be subsequently described.

Figure 4:
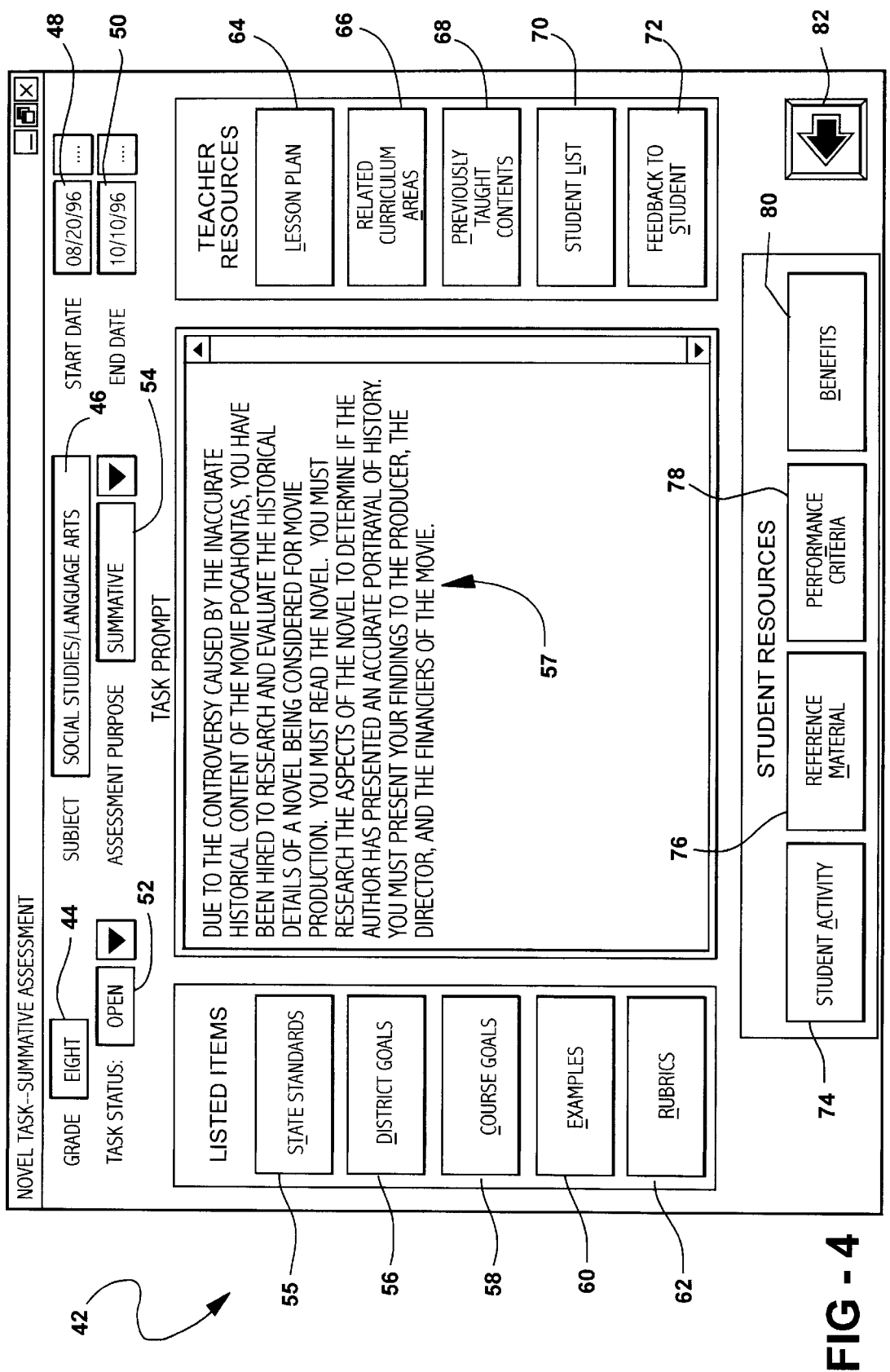
FIG. 4 is an illustration of a teachers task template screen for use with the performance task developer screen.

Referring to FIG. 4, a performance task template screen 42 is accessible directly from the task developer screen 32 and further provides information regarding the selected task as well as a volume of additional information which will be subsequently described, such information including district and school goals that are assigned to the task, rubrics and exemplars linked to the task, and procedural criteria and evaluative criteria. Also, the teacher can view the performance of a student who is assigned a given task by selecting a task rating portion in the task template screen 42 and can further provide an evaluation of the student. The teacher can also view a student workfolder, as will also be subsequently described, from the task template screen for any student who is assigned a task.

Specifically, the performance task template screen 42 includes a summative assessment presentation which incorporates a student grade entry 44, a subject entry 46, an assignment start date 48, an assignment end date 50, a task status entry 52 and an assessment purpose entry 54. Among the linked items previously described is a state standards icon 55, a district goals icon 56, a course goals icon 58, exemplars 60 and rubrics 62. Also listed under teachers resources are a lesson plan icon 64, a related curriculum areas icon 66, a previously taught icon 68, a student list 70 and a feedback to students icon 72. Also listed under student resources is a student activity icon 74, a reference material icon 76, a performance criteria icon 78 and a benefits icon 80. Finally a go back icon is illustrated at lower right arrow 82 and permits the operator to regress to the previous screen 32.

Many of the previously identified icons are self explanatory and further are still to be subsequently described as previously indicated, however the various functions of the task template screen 42 operate to permit the instructor to develop authentic performance assessment tasks and multi media projects, maintain common sets of exemplars and rubrics which are linked to the tasks and projects and to further maintain, monitor and grade the students' work as well as provide feedback regarding the work and assign completed tasks to the students' portfolios, as will be subsequently described.

Figure 4A:
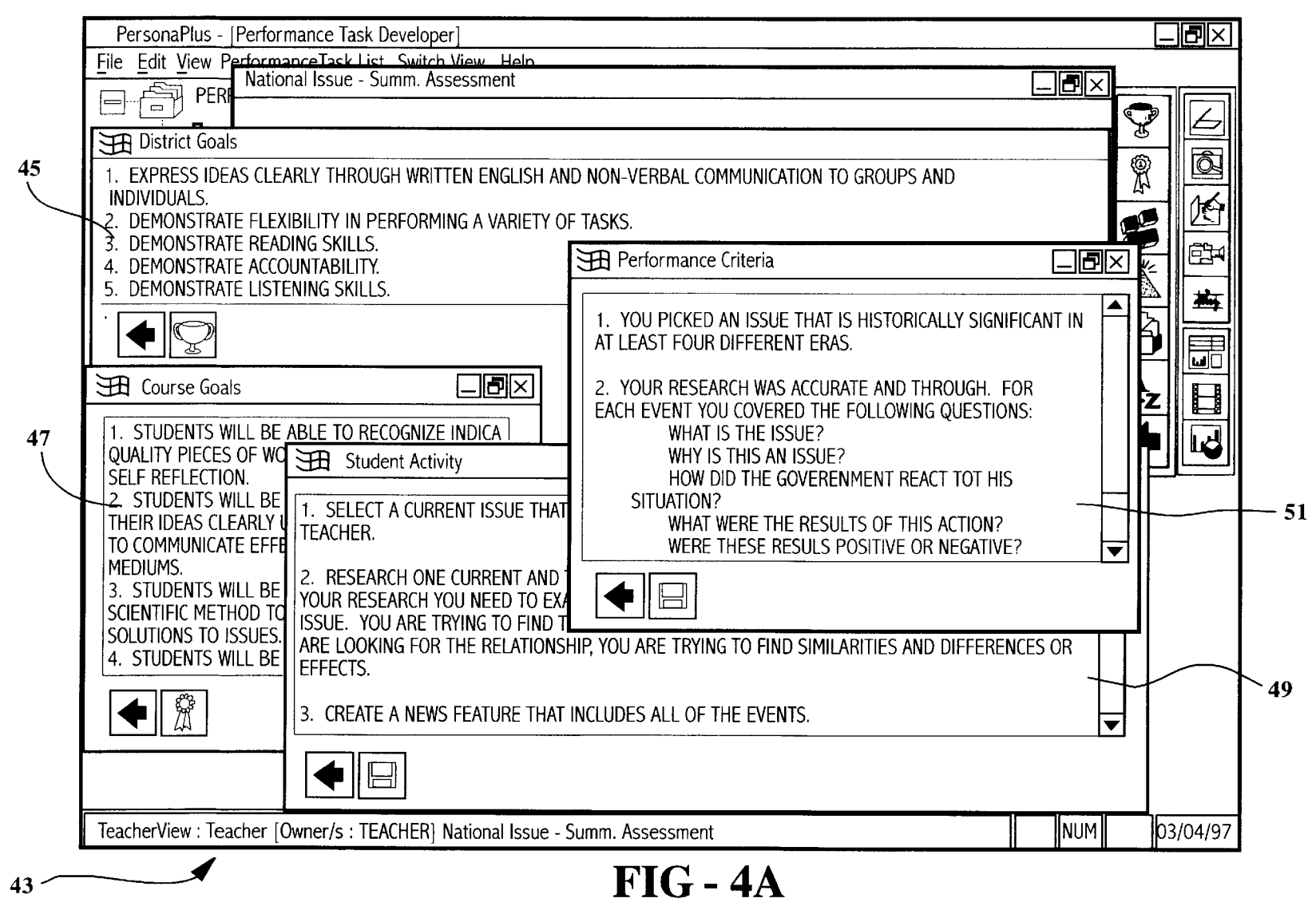

Referring to FIG. 4a, an explanatory screen 43 is provided which illustrates a plurality of individual windows which can be accessed by clicking on an associated icon in FIG. 4 in order to provide the user with a detailed explanation of the specific task. Included among these are a district goals listing 45, a course goals listing 47, a student activity listing 49 and a performance criteria 51.

Figure 5:
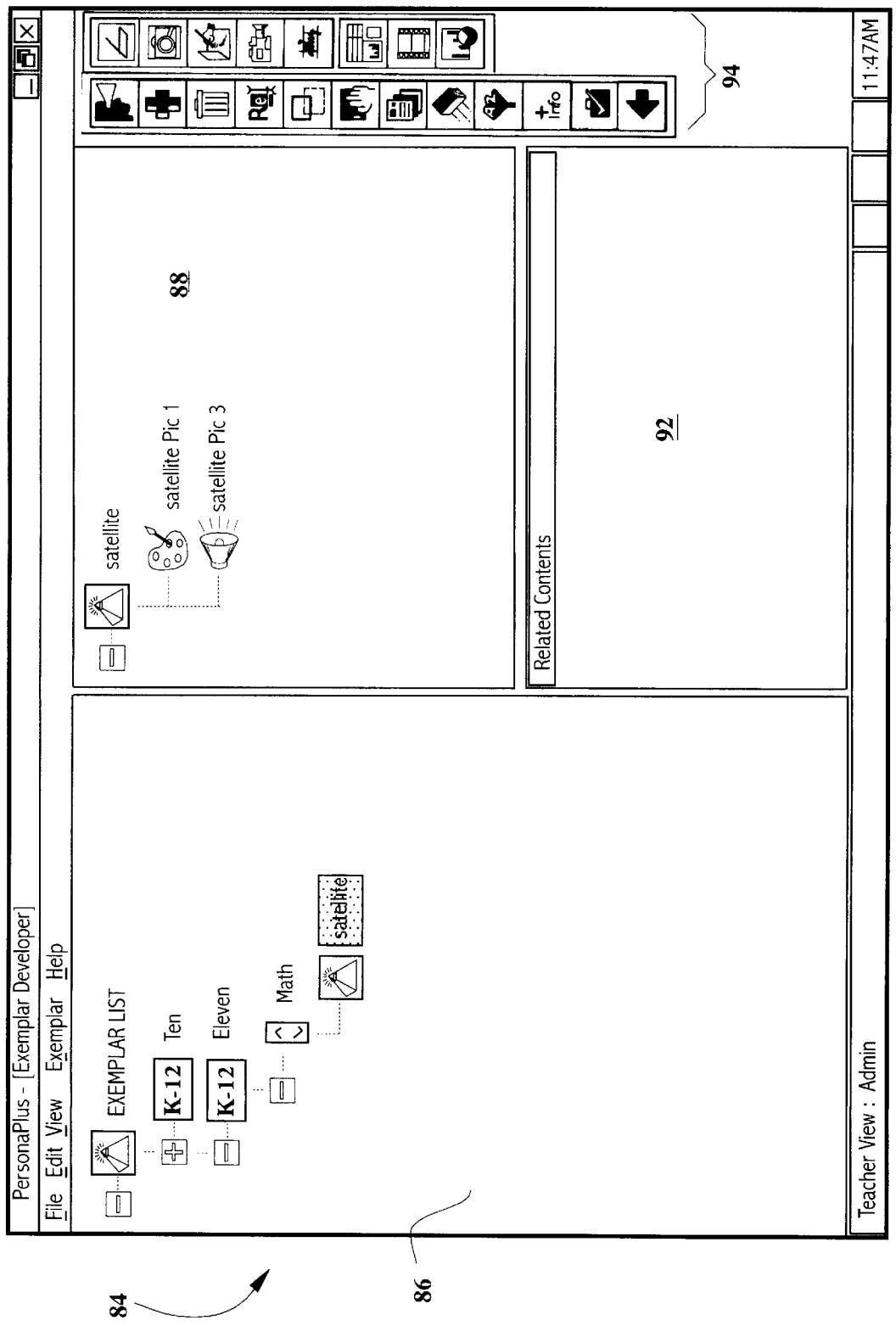
FIG. 5 is an illustration of a teacher modifiable/student viewable exemplar development screen.

Referring now to FIG. 5, a teacher modifiable, student viewable exemplar developer screen 84 is illustrated and includes a listing portion 86 of all exemplars created, a detail portion 88 of a selected exemplar and a related contents portion 92 for the associated task. A toolbar portion 94 is again provided to facilitate usage of the exemplars and includes both software operating icons as well as multi media input icons for use in either activating selected multi media components which may be operatively connected to the system or in playing previously recorded presentations prepared utilizing the multi media components.

An exemplar for purposes of this invention is defined as a model of exemplary achievement or sample of excellent work for students to emulate in their own progress. The concept of using exemplars as applied to the present invention is to present the students with examples of the kind of work the student should be attempting to achieve in the course of their performance and in the assembly of their presentations as will be described. By definition, the exemplars may include works which a teacher develops or some of the best work of other students or further may simply consist of instructions provided by the teacher. The networked nature of the system and method according to the present invention permits the user (teacher, student, administrator) to share the exemplar work with others throughout a school, community or state as is contemplated by the invention.

Figure 6:
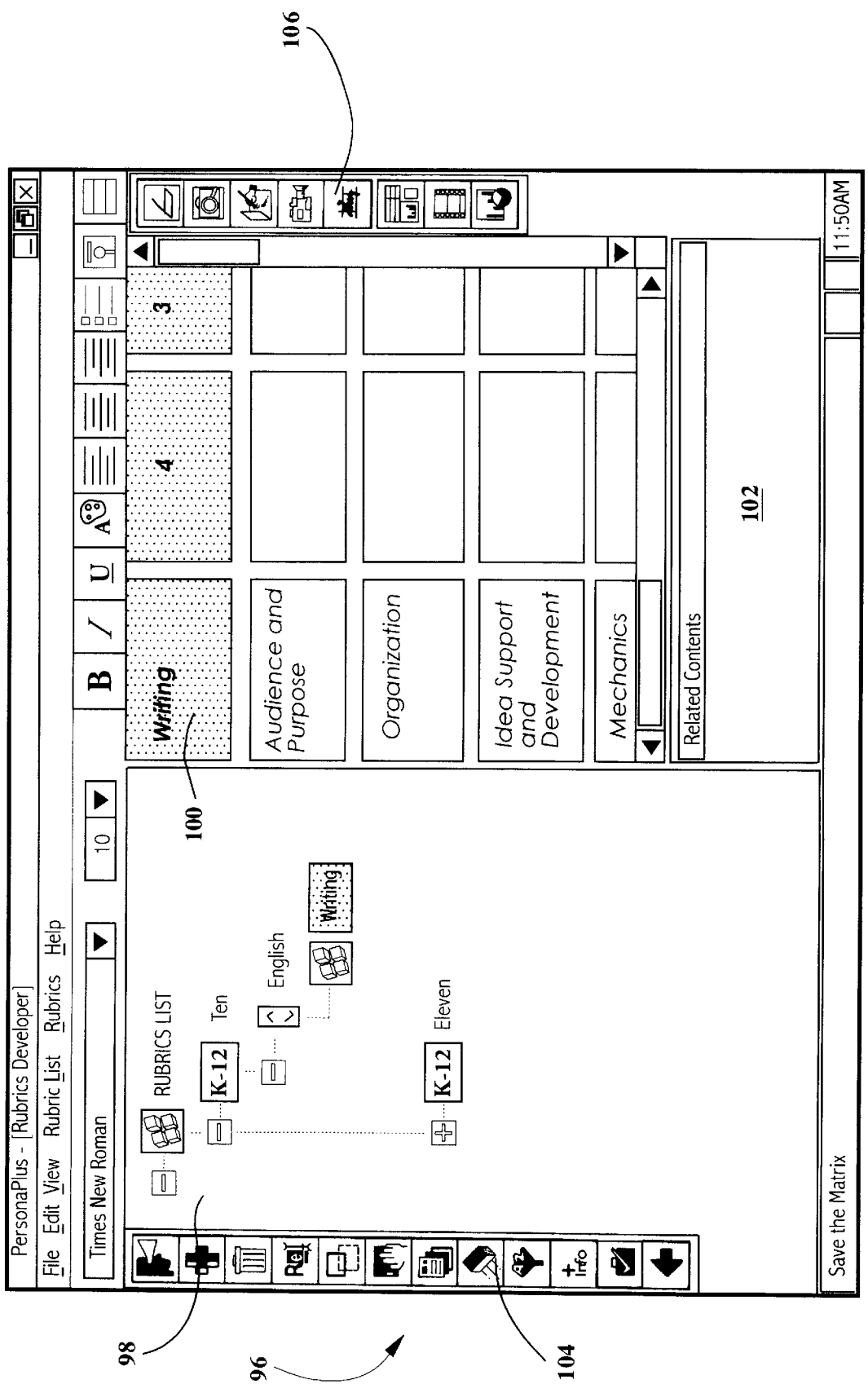
FIG. 6 is an illustration of a teacher modifiable/student viewable rubrics developer screen.

Referring now to FIG. 6, a rubrics developer screen 96 is illustrated and includes a rubric listing portion 98 for the various school grades, a rubrics detail portion 100 and a related contents portion 102 for the assigned task. A rubric defined according to the present invention is a set of scoring guidelines for evaluating student work and may further be subcategorized as either a holistic rubric which is score based on overall impression or an analytic trait rubric which is a score based upon specific dimensions. The rubrics are teacher modifiable, student viewable as are the previously described exemplars and a given rubric is selected by clicking on the desired item in the listing portion 98 so as to list the details of the selected rubric in the portion 100, such details including such items as the audience and purpose, organization, idea support and development and mechanics. Addition and modification of a selected rubric is accomplished by key entering and key modifying the items listed in the details screen portion 100 and rubrics may further be deleted as desired. Additional toolbar portions 104 and 106 are provided along the left and right portions of the viewable screen, respectively, and once again permit the user to access different functions of the writeable program or other multi media input items.

Figure 7:
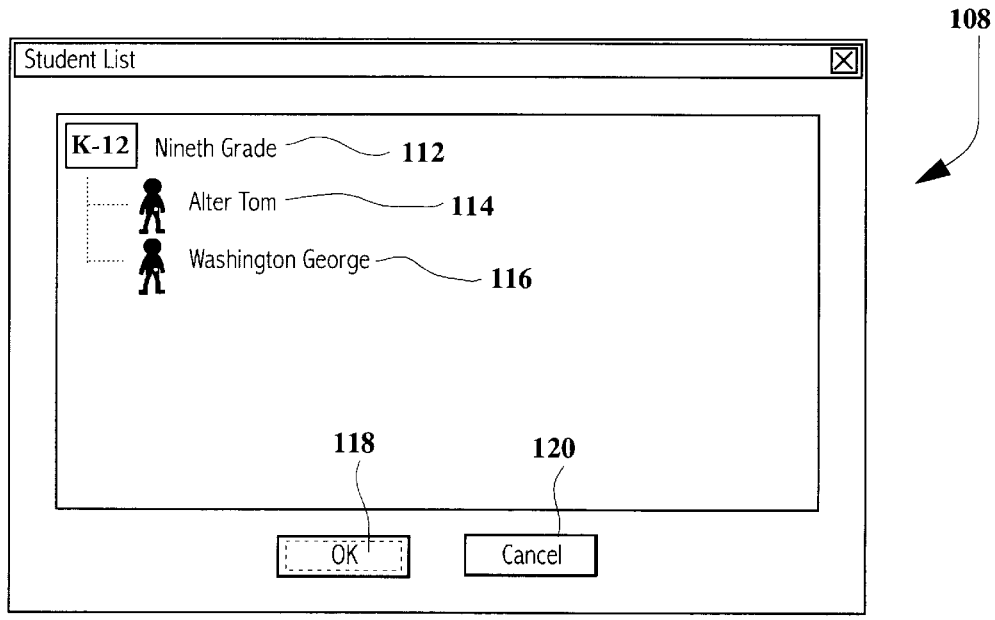
FIG. 7 is an illustration of a student list screen.

Referring now to FIG. 7, a student list tree screen 108 is shown and permits a user, in most instances an educator or administrator, to access a given student's workfolder by first clicking on a given grade icon 112 and then selecting a given student 114 or 116 by in turn double-clicking on its associated icon using a computer mouse or by clicking an ok button 118 or cancel button 120 which are located along a lower edge of the screen 108. It is understood that the button functions indicated throughout the various screens may be replaced by typing in appropriate command and hitting an enter button in the event a DOS based system is employed.

Figure 8:
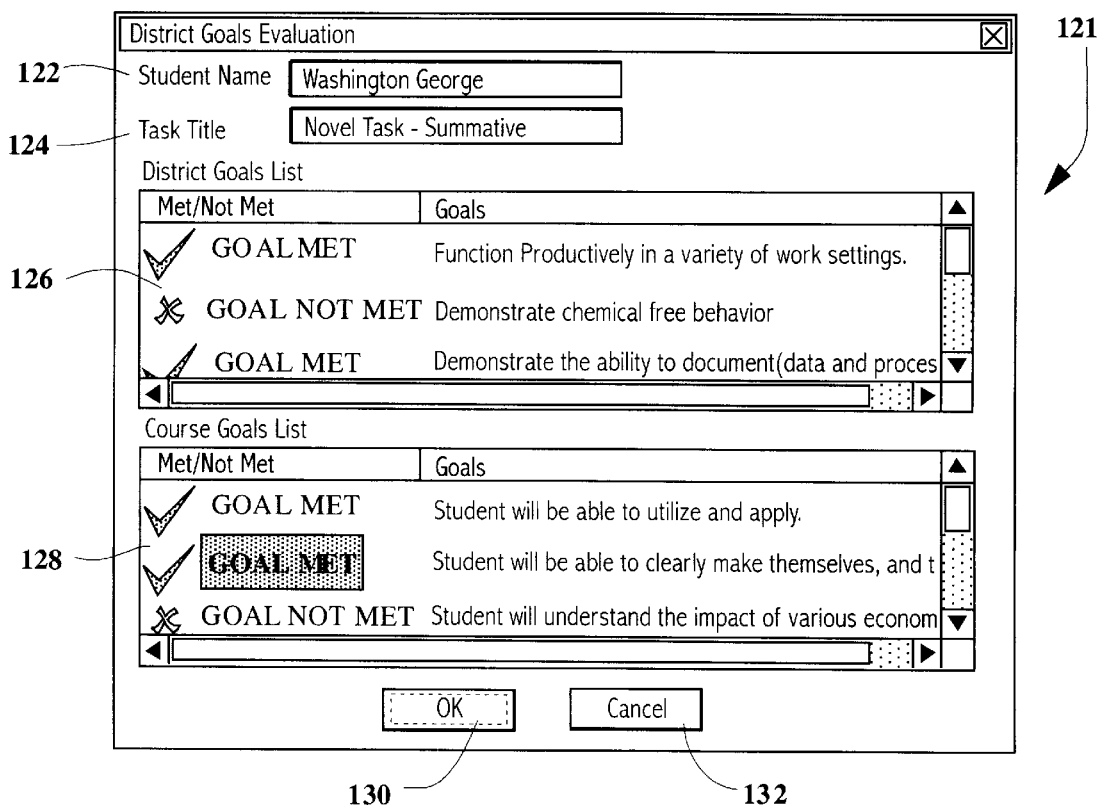
FIG. 8 is an illustration of a district goals evaluation screen.

Referring to FIG. 8, a district goals evaluation screen 121 is illustrated and provides the operator, once again most usually a teacher or administrator, with the ability to view, add or edit an evaluation. The district goals evaluation screen 121 includes a student name entry portion 122, a task title entry portion 124, a district goals list 126 and a course goals list 128. Again an ok button 130 and cancel button 132 are provided to either progress to a succeeding screen page or return to a previous page.

Figure 9:
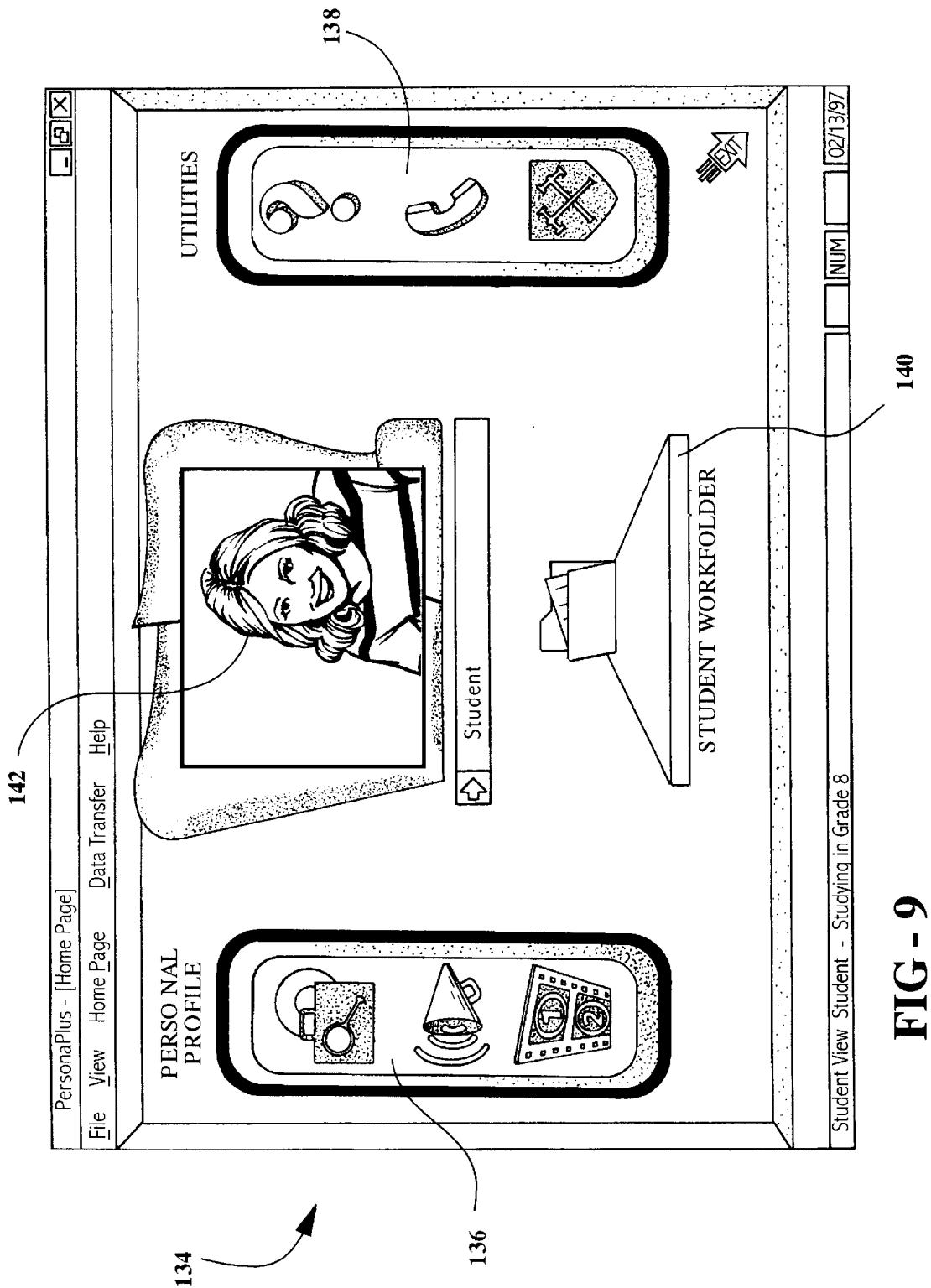
FIG. 9 is a student home page screen according to the interactive multi media performance assessment apparatus and method according to the present invention.

Referring to FIG. 9, a student home page screen 134 is illustrated and may be directly accessed from the home page 10 by a student once the appropriate login sequence has been key entered. The student home page screen 134, similar to the teacher's home page screen 22, includes a personal profile menu 136 for accessing stored multi media presentations, a utilities menu 138 for accessing such outside sources as Internet connections and the like and a student workfolder table top menu 140 for permitting the student to construct a workfolder as will be subsequently described.

Figure 10:
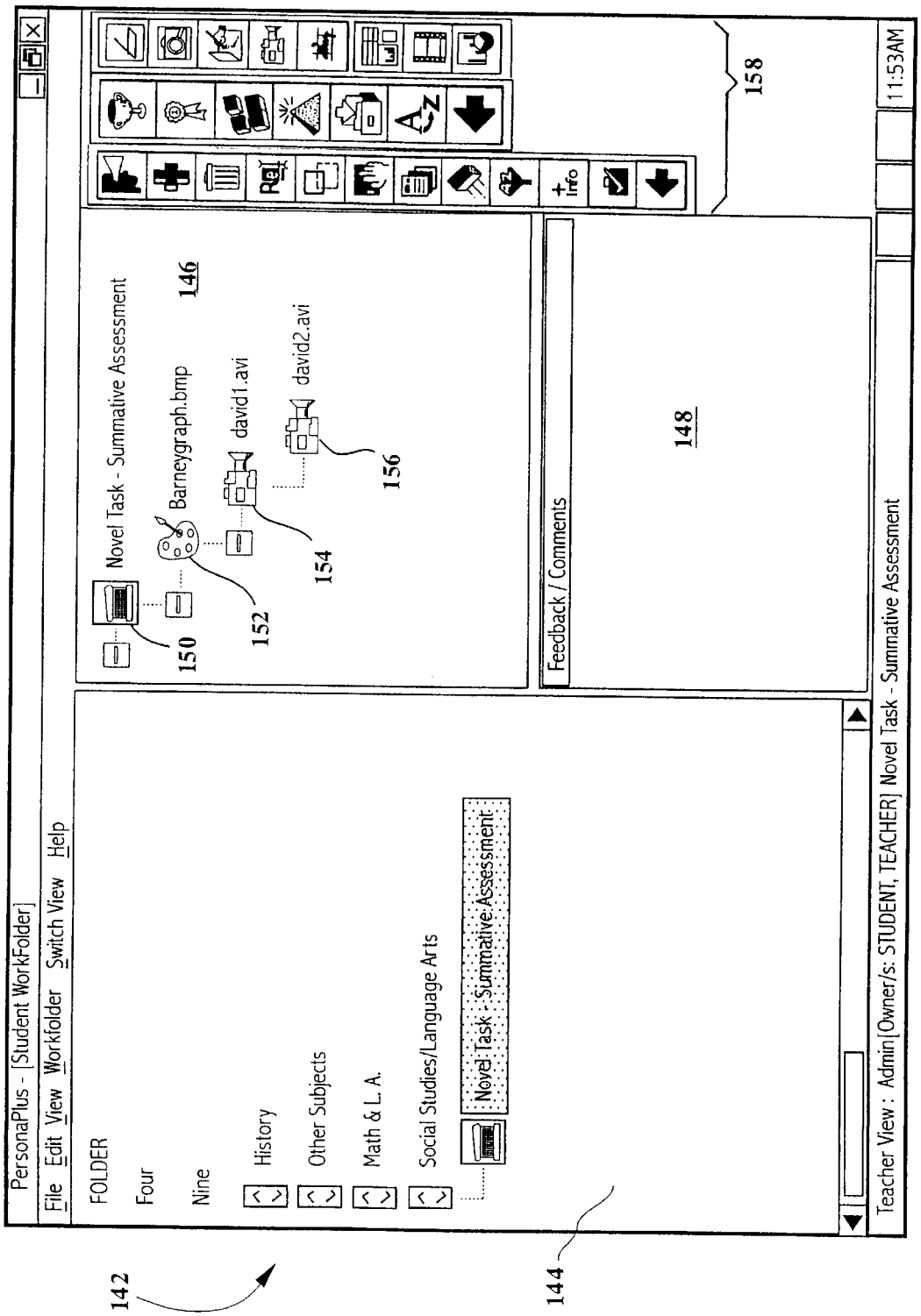
FIG. 10 is an illustration of a student workfolder screen.

Referring now to FIG. 10, a student workfolder screen 142 is illustrated which is accessed by the student clicking on the icon 140 in the screen display 134 of FIG. 9. The student workfolder screen 142 includes a listing portion 144 of all workfolders that have been created, a details portion 146 which specifies all the operative components of a selected workfolder in the listing portion 144 and a related contents portion 148 for listing any feedback or comments relative to the assigned task for which the workfolder was created. As will be better described, the details portion 146 lists certain multi media creations which make up a student presentation and may include a text of material at 150, a paintbrush creation at 152 and some form of visual or video performance 154 and 156 which in summation make up the presentation. Also illustrated is a toolbar 158 which includes both program operating/modifying icons and multi media accessing icons as has been described.

Figure 11:
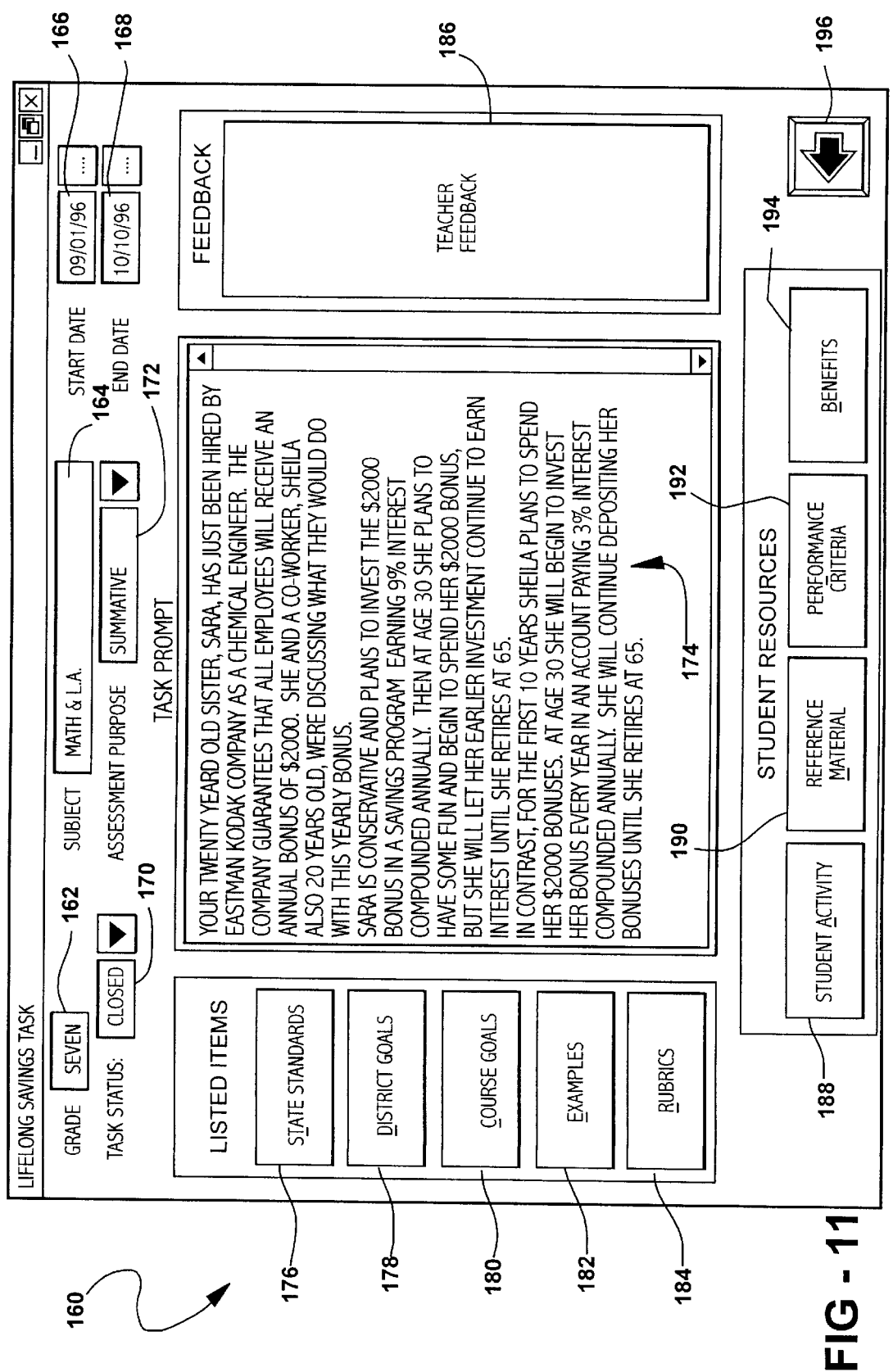
FIG. 11 is an illustration of a student task screen for use with the workfolder screen of FIG. 10.

Referring now to FIG. 11, a student task screen 160 is illustrated which is accessible by a student directly from the student workfolder screen 142. A selected student workfolder is created upon the issuance of a performance task from an instructor and the task screen 160 includes such items as a grade key entry portion 162, subject entry portion 164, start date entry portion 166, completion date entry portion 168, task status entry portion 170 and assessment purpose entry portion 172. The student task screen 160 is considered a template screen of the workfolder screen 142 and illustrates the particulars of a selected task illustrated in the list portion 144 and details portion 146.

A task prompt portion 174 provides the student with a summary of the task being assigned by the instructor based upon which the student will subsequently prepare a presentation. Similar to the teacher modifiable performance task template screen 42, the student task screen 160 includes such linked items as a state standards icon 176, a district goals icon 178, a course goals icon 180, an exemplars icon 182 and a rubrics icon 184. A teacher feedback icon 186 is provided to permit a student to review comments from the teacher relevant to a presentation the student is involved in producing and which has been reviewed and commented on in some fashion by the teacher. Additional student resources are listed as student activity icon 188, reference material icon 190, performance criteria icon 192 and benefits icon 194. Finally, a return icon is illustrated by arrow 196. The student workfolders which are created using the task screen 142 and template screen 160 permit a student/user of the system and method of this invention to perform such tasks as create multi media presentations, access assigned performance tasks and projects including exemplars, rubrics, criteria and resources and to choose selected performance tasks for inclusion into a digitally created portfolio.

Figure 31:
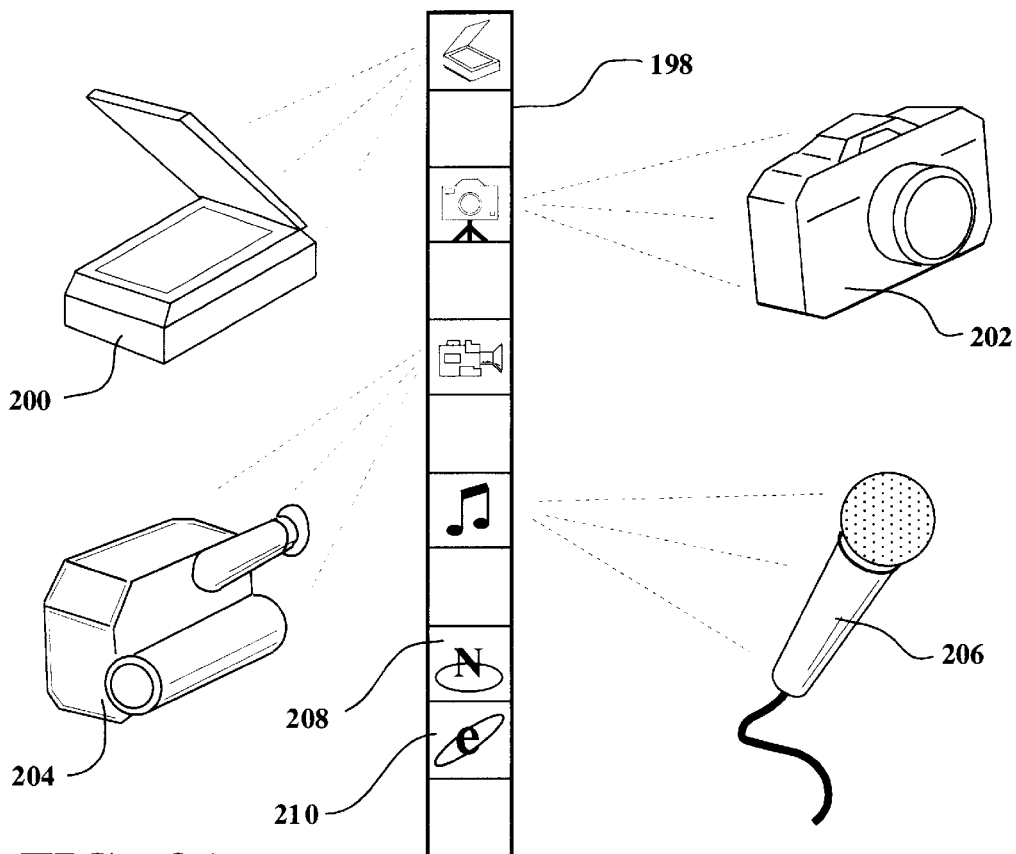
FIG. 31 is a view of a conventional workstation and connecting network with which the interactive multi media performance assessment system and process according to the present invention is used.

With reference to FIG. 31, a multi media portion of a toolbar 198 is illustrated which is similar to a portion of either the toolbar 158 of the student workfolder screen 142 or a portion of the toolbar 40 of the teacher performance task developer screen 32. In use, the student will review the requirements of the assigned performance task and will then proceed to select various accessible multi media components to be used in the creation of a multi media presentation on the assigned task. The most basic component which would be utilized would be a conventional word processing program, such as WordPerfect® or Microsoft Word®. Referring again to FIG. 31, additional components may include a flatbed scanner 200 for scanning pictures, graphics, and illustrations directly onto the student workfolder and student portfolio. A digital camera 202 can be used to launch digital still pictures effortlessly from the writeable media and system of the invention and can add pictures to performance tasks. A video camcorder 204 creates and edits live video presentations or imports video directly from a video cassette recorder or home video cassette. Also, an audio recorder 206 records presentations, music speeches and teacher-student dialogue which may be incorporated into the system as a digital file. Finally, Internet access browsers such as Netscapet® 208 and Microsoft Internet Explorert® 210 may be accessed and pre-recorded audio and visual digital files as well as other textual material may be accessed by students in the course of preparing their presentations and then assigned to a directory within the associated workfolder.

Figure 33:
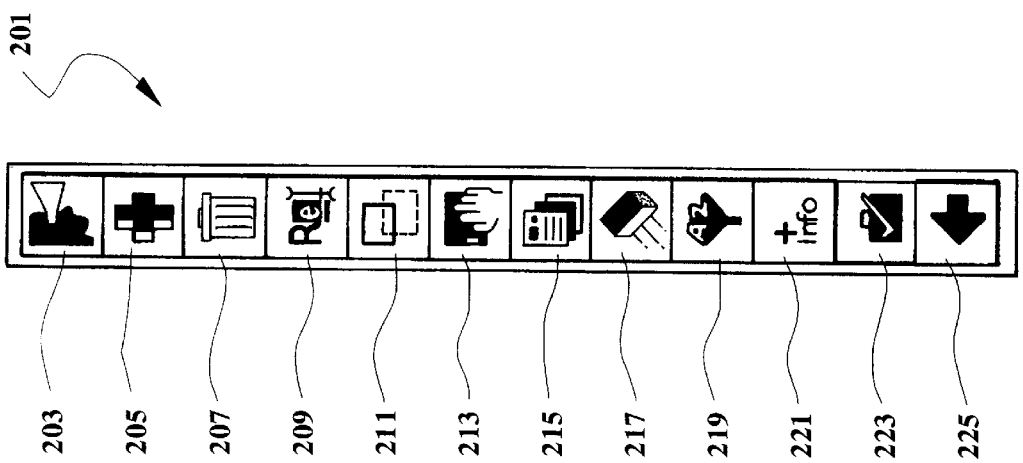
FIG. 33 is a view of a portion of a floating toolbar for maintaining the program contents.

Referring to FIG. 33, a portion of a floating toolbar is illustrated which shows an operating toolbar for the system which is content sensitive and which identifies various controlling icons. Among these are a view icon 203 which starts the appropriate system to show contents based upon its type. An add icon 205 is shown which is content sensitive and knows whether a grade, subject or item is being added. A delete icon 207 is sensitive as to whether there are dependent objects, e.g. workfolders, evaluations, etc., which need to be deleted. A rename icon 209 functions to change the title of the object (task, file, etc.,). A copy/paste icon 211 serves to copy any portion of the program. A paste icon 213 functions to paste the copied portion to any other portion of the program. A resources icon 215 serves to illustrate a listing of resources and references. A refresh icon 217 illustrates the latest information queried from the database. A filter icon 219 views selectively items related to specific grades or subjects. An additional information icon 221 is provided for maintaining notes regarding any specific item within the system in order to manage its ownership and to view related and associated information. A portfolio marking/unmarking icon 223 is provided for marking or unmarking a workfolder or other item for use in presentation or portfolio. Finally, an exit icon 225 returns the user to a preceding screen.

Figure 34:
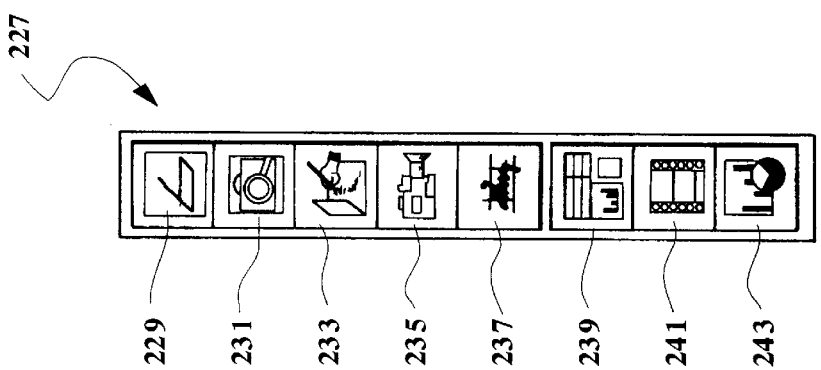
FIG. 34 is a view of a portion of a floating toolbar for launching external programs within a platform operating system.

Referring to FIG. 34, a floating toolbar portion 227 for launching external programs is illustrated for scanning or otherwise incorporating external programs to interface with the system, preferably digital still cameras as was previously described with reference to FIG. 31. Included in FIG. 34, is a scanner icon 229 which calls up a scanning interface program. A digital camera icon 231 interfaces with the program to insert a still photograph. A word processor icon 233 interfaces with a word processor program of choice. A video recorder icon 235 interfaces to a video camera program for permitting entry into the program a video selection recorded from a video camera. An audio recorder 237 interfaces with an audio program for entering any audio file created by an audio input. A charts icon 239 starts a program to create charts to be inputted to a selected file within the program. A movie producer icon 241 interfaces to produce any type of motion picture or animation clip for insertion into a file. Finally, a graphs icon 243 interfaces with a graphing program to insert a graph into a file.

Figure 35:
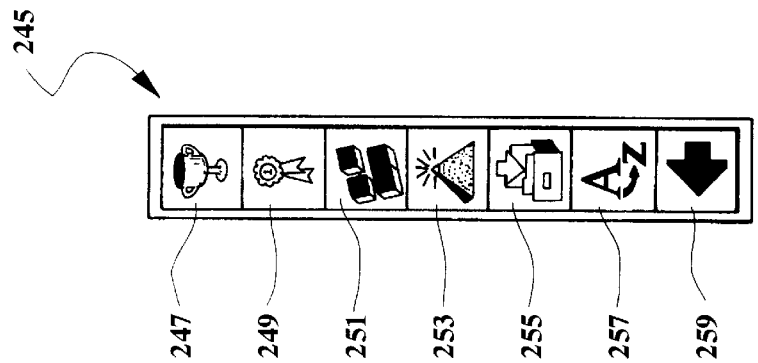
FIG. 35 is a view of a portion of a floating toolbar for viewing and linking related information.

Referring to FIG. 35, a floating toolbar portion is shown for illustrating a menu for related items and includes a district goals icon 247, a course goals icon 249, a rubrics icon 251, an exemplars icon 253, a task prompt icon 255, a student list icon 257 and, finally, an exit icon 259 for returning the user to a previous screen.

As is well known in the art, personal computer technology has well advanced to the stage where audio and visual elements in addition to merely textual based information may be generated using multi media components including those previously described and conveniently recorded and saved in a digitized format in files within the computer writable media which are associated with the given workfolder. The purpose of providing the student with access to the numerous different types of multi media sources is to encourage the student to express an optimum degree of his or her creativity and effort in assembling a presentation which is indicative of the student's understanding of what was learned in the classroom. This further goes to an underlying concept of the interactive multi media performance assessment system and method according to this invention, that being the ability to more effectively analyze a student's actual performance for a specified assigned performance task in addition to what indicators are provided through more standardized grading and test scoring procedures. It should be further understood that the computer writable media and system of the present invention is established so that instructors and administrators may also input multi media based presentations for establishing a permanent record of such communications and further to more effectively communicate with the students and to provide more effective assessments and evaluations of the student generated presentations.

A further unique feature of the system, method and computer writable media of the present invention is that it permits the user, whether it be a teacher, student or administrator, to import or export certain functions of the program onto a computer writable media by either copying or by transmitting such information using a conventional computer modem and a file transfer program. Specifically, a student who wishes to work on a presentation from a home computer can either copy relevant portions of the associated performance assessment task onto a floppy disc or CD Rom or may make use of a modem and file transfer program to export the necessary information in an outbox to a desired home directory. In the same fashion, work may be imported to a home operating system using the same equipment and software and within the intended scope of the present invention.

Figure 32:
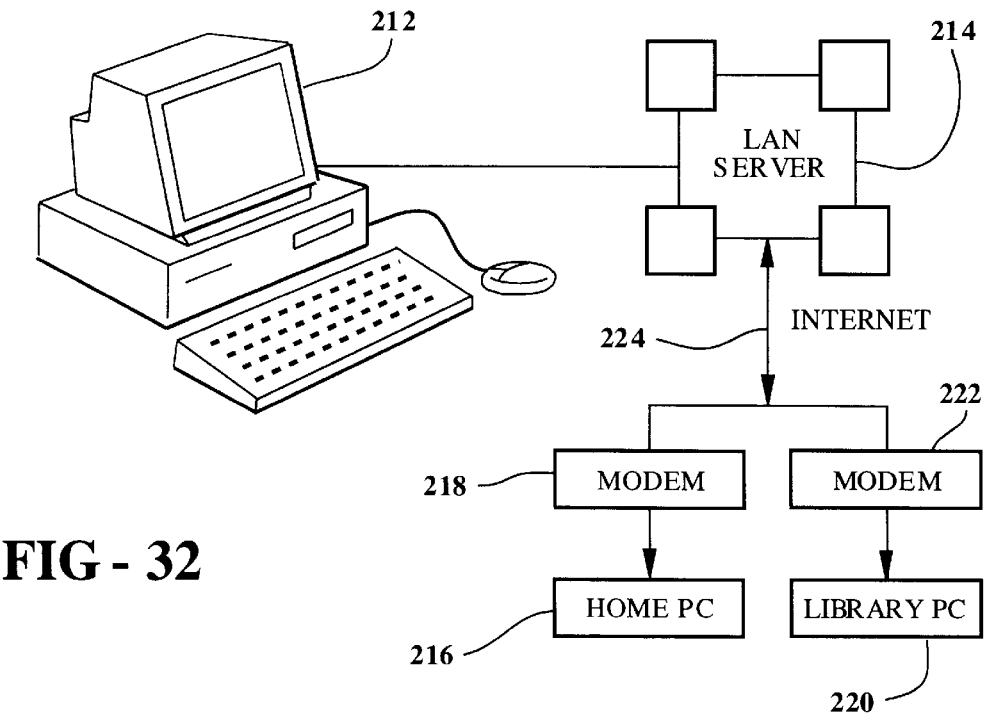
FIG. 32 is a view of a toolbar portion of an applicable screen display which illustrates a selection of multi media items with which a multi media portfolio may be generated.

Referring to FIG. 32, an example of a personal computer network application is illustrated and includes a PC operating system 212 such as a school based computer which includes a monitor, hard drive, keyboard and mouse and which is connected to a communication network LAN Server 214, such server normally including a network of computers spread throughout a given location, such as a school. Additional computers can be remotely connected to the LAN Server, such as by Internet connection and may include a home PC 216 connected by modem 218 and a library PC 220 connected by modem 222, both modems 218 and 222 capable of activating an Internet connection 224 through a suitable web browser. The embodiment of FIG. 32 provides one feasible illustration of how an operative network of remotely located and connected operating systems may be arranged and is intended to illustrate the flexibility of the system according to the present invention.

Figure 36:
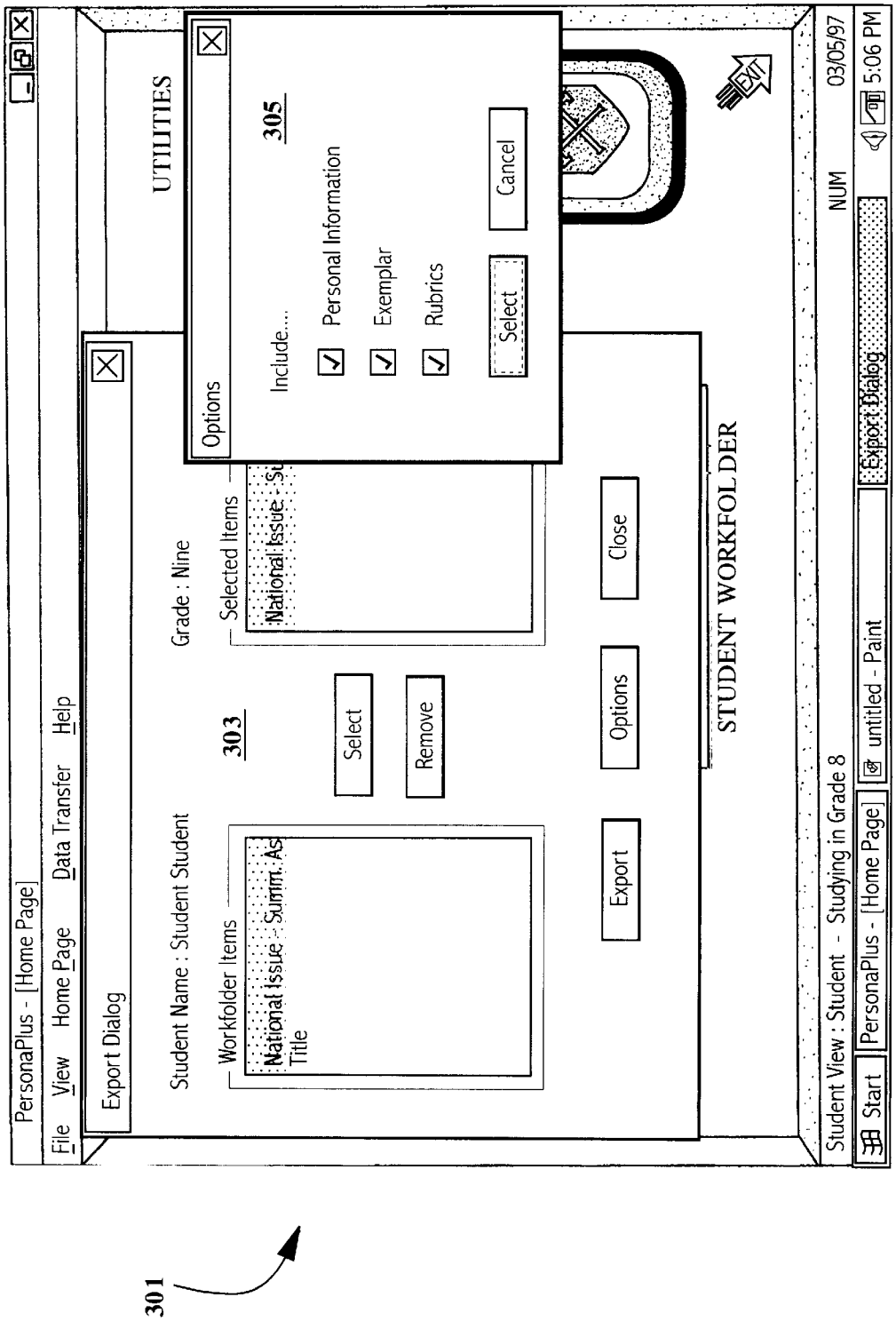
FIG. 36 is an illustration of an export dialog screen.
Figure 37:
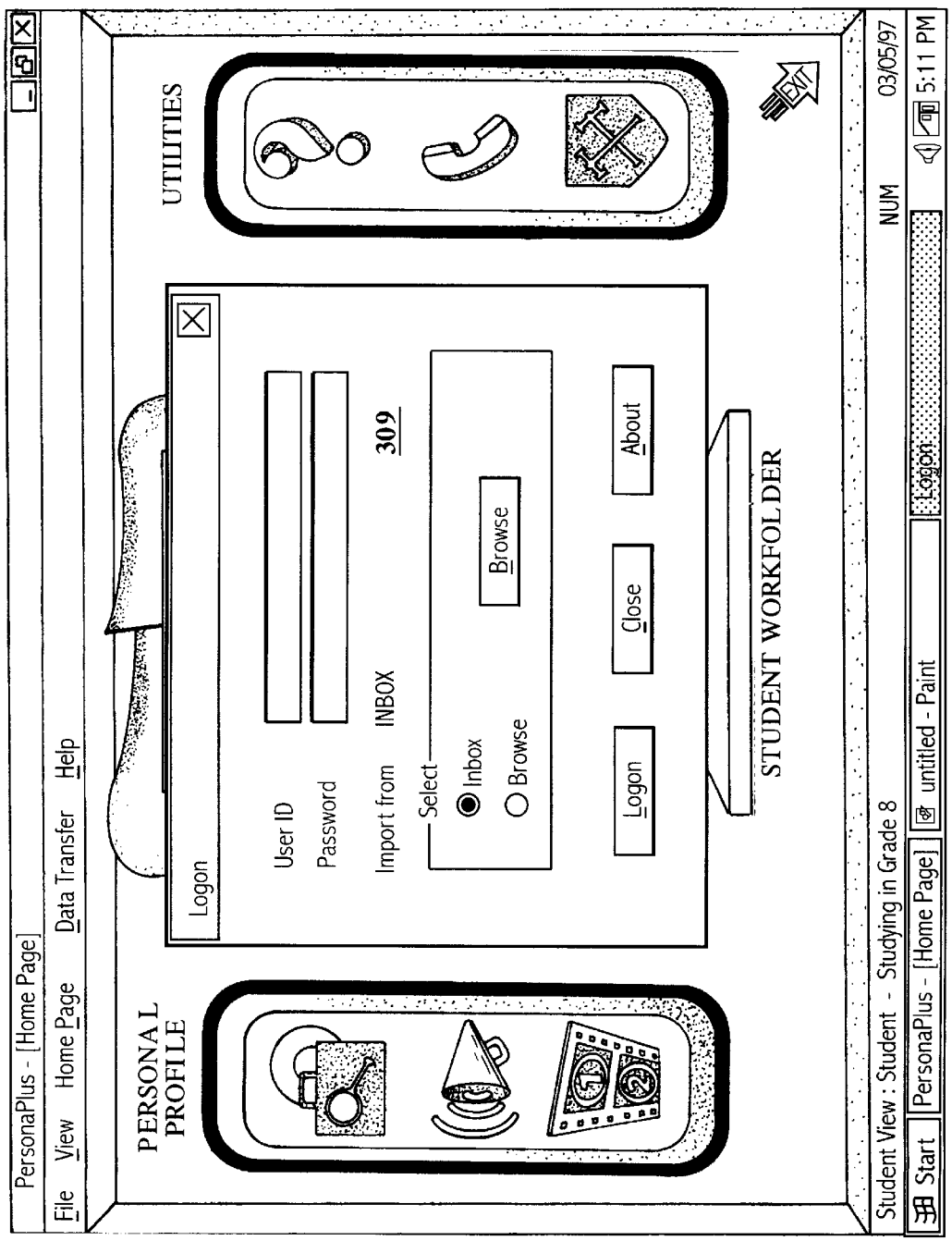
FIG. 37 is an illustration of an import dialog screen.

Referring to FIG. 36, a screen 301 is shown which permits a student to download selected tasks for exporting for use at a remote location, such as between school and home. The export screen 301 includes a task selection screen portion 303 which lists the available tasks for export by the student and permits selection of specific items. An options screen portion 305 allows inclusion of personal information and/or exemplars, rubrics to be incorporated into the export process for the selected tasks. Referring to FIG. 37, an import screen 307 permits a previously exported item or task which has been worked upon to be reintroduced into the system in its modified or supplemented form. The import screen 307 includes a log on box 309 which permits the selection and introduction of the previously exported files.

A still further advantage of the system and computer writable media of the present invention is that it provides the internal capability to permit a student to compile his or her best work onto a student portfolio, such portfolio typically comprising a recorded CD-Rom. The student can select the best of their work and write their own portfolio in a predefined format and along with a portfolio view tool which permits a receiver to view the student's work. Such a customized multi media portfolio is useful for illustrating a student learning and achievement history from kindergarten through twelfth grade and in the future is anticipated to be a highly valued item which is anticipated to supplement and/or replace more traditional grade transcripts which are reviewed by college admission officials and potential employers.

Figure 38:
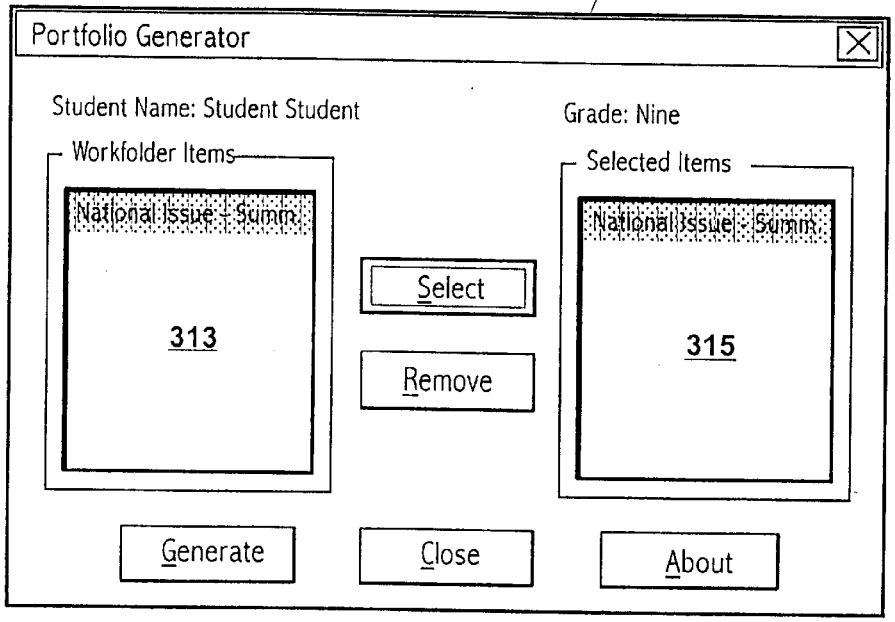
FIG. 38 is an illustration of a portfolio generator screen.

The means for permitting a student to assemble a portfolio are better described now upon reference to FIGS. 38–44. FIG. 38 illustrates a portfolio generator screen 311 which includes a workfolder item task list 313 for items marked for portfolio and a selected items list 315 which allows the user to select those specified portfolio items to generate a portfolio.

Figure 40:
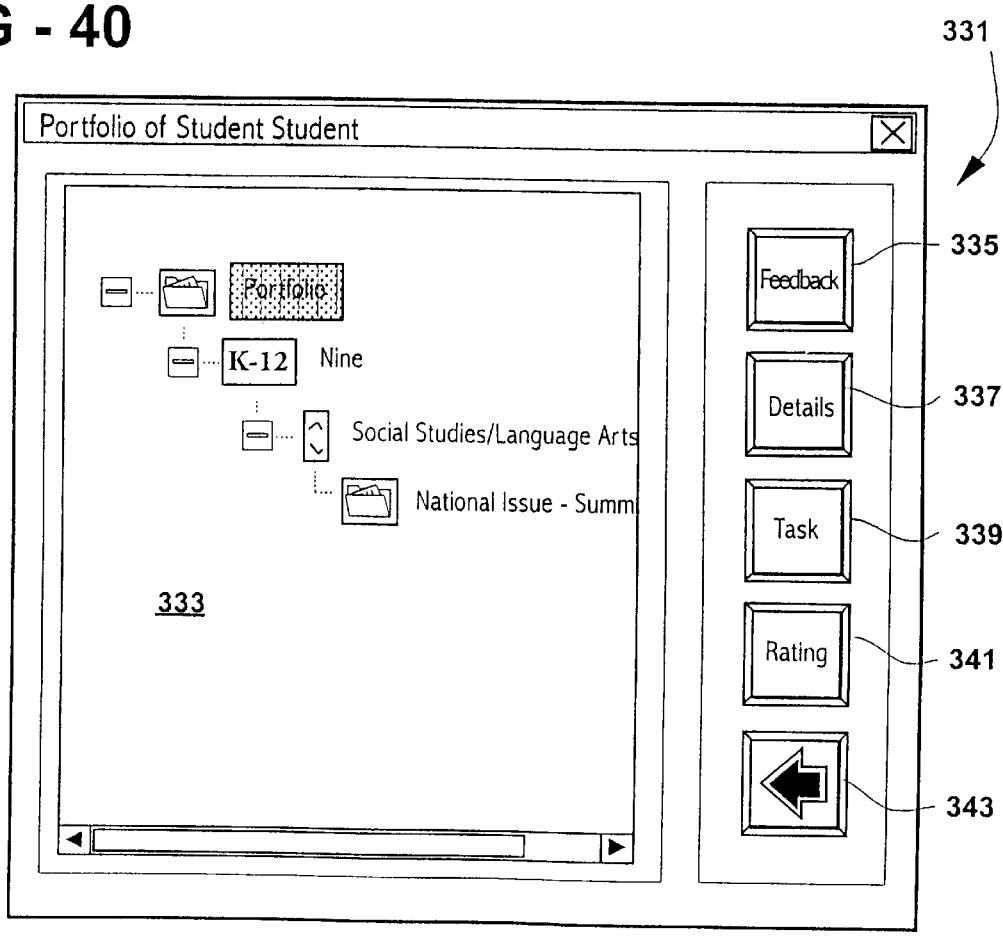
FIG. 40 is an illustration of a portfolio detail screen.
Figure 39:
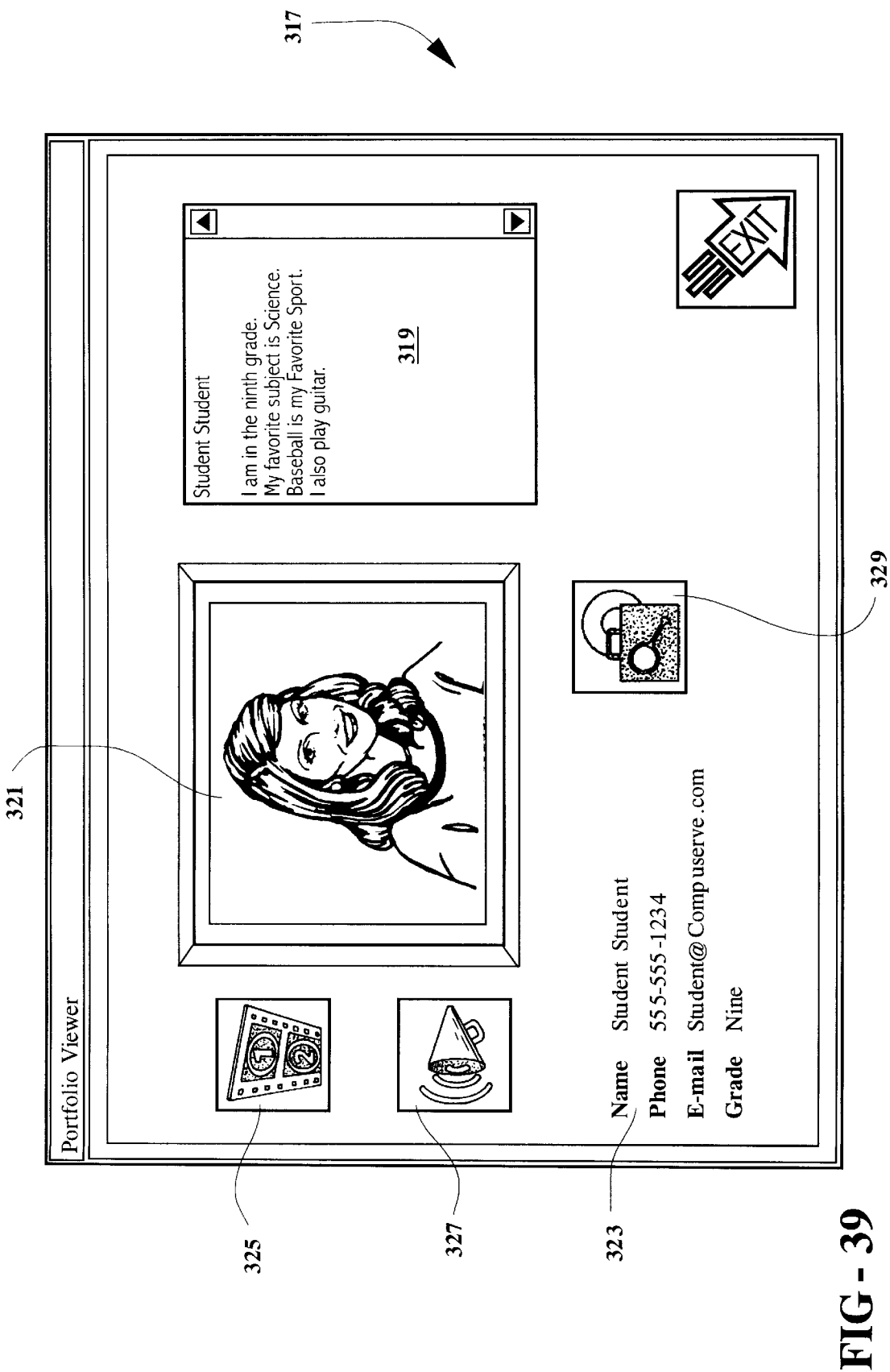
FIG. 39 is an illustration of a portfolio viewer main screen.

Referring to FIG. 39, a portfolio view main screen 317 is illustrated which describes the student's portfolio, the student and the personal information of the student as evidenced by student information box 319, illustrative screen 321, personal information segment 323 and audio and visual accessible information 325 and 327 relevant to the student. A next screen icon 329 permits the user to proceed to a view portfolio detail screen 331 as is illustrated in FIG. 40. The portfolio detail screen 331 includes a task list 333 of selected portfolio items organized by grade and subject and further includes a feedback icon 335 for accessing comments relevant to a given selected task, a details icon 337 for obtaining details of the portfolio task, a task prompt icon 339 for accessing the assigned task, a rating icon 341 for viewing the instructor's evaluation of the task or presentation, and finally, a go back screen icon 343.

Referring to FIG. 41, a task details screen 345 is shown and illustrates in detail the task assigned by the teacher with such items as identifying the task, a description of the task, benefits to the student for completing the task and the expected student activity to complete the task.

Figure 42:
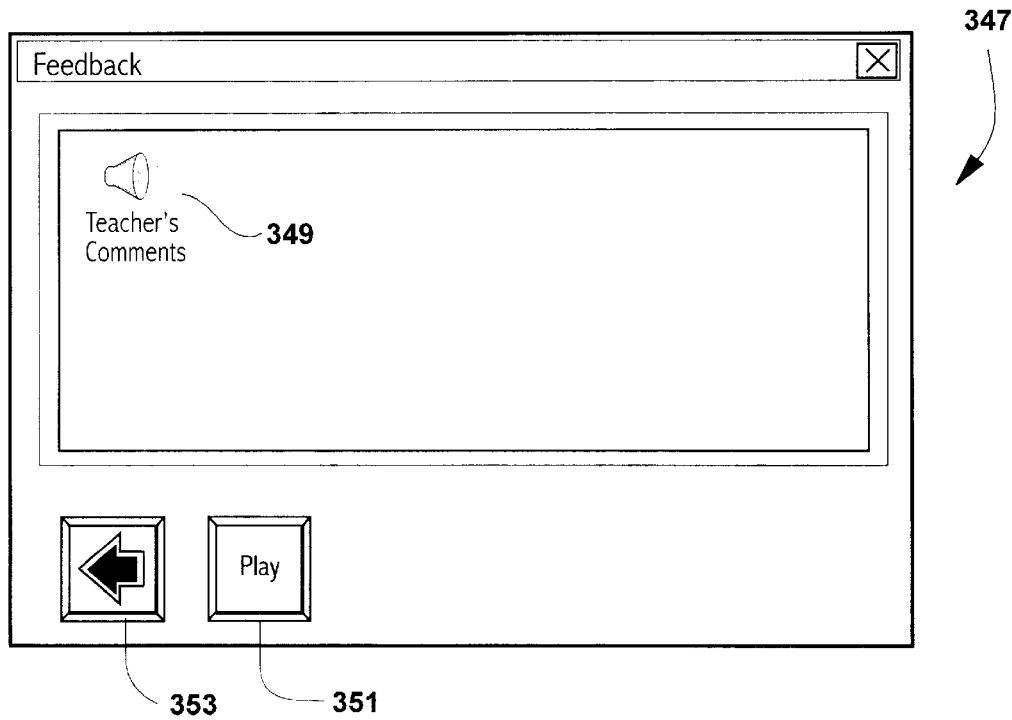
FIG. 42 is an illustration of a feedback screen for the portfolio.

Referring to FIG. 42, a teacher's feedback screen 347 is shown and includes an icon 349 for viewing audio visual comments related to a given task or presentation. Icon 351 plays the selected comments and icon 353 returns the user to the previous screen.

Figure 43:
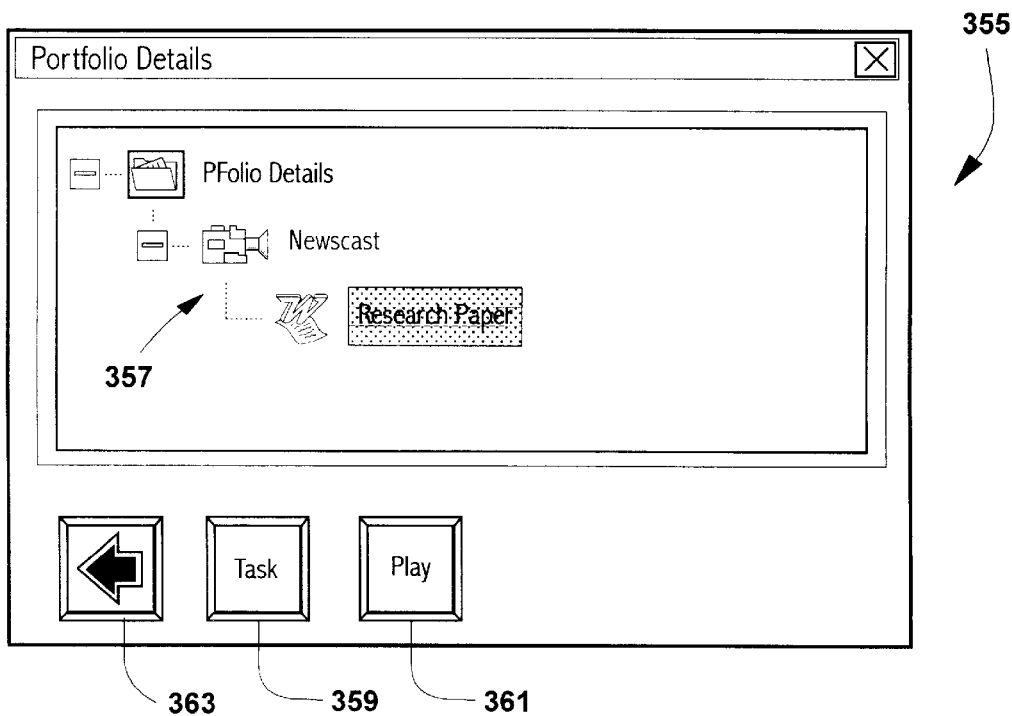
FIG. 43 is an illustration of a details for a portfolio task screen.

Referring to FIG. 43, a portfolio task details screen 355 links the user to the selected task as illustrated by details icon 337 in FIG. 40. The task details screen 355 includes a listing of the multi media table of contents 357 for a given presentation, a task button 359 for viewing the task details as illustrated in FIG. 41, a play button 361 for viewing the contents of the selected item and a go back button 363 for returning to a previous screen.

Figure 44:
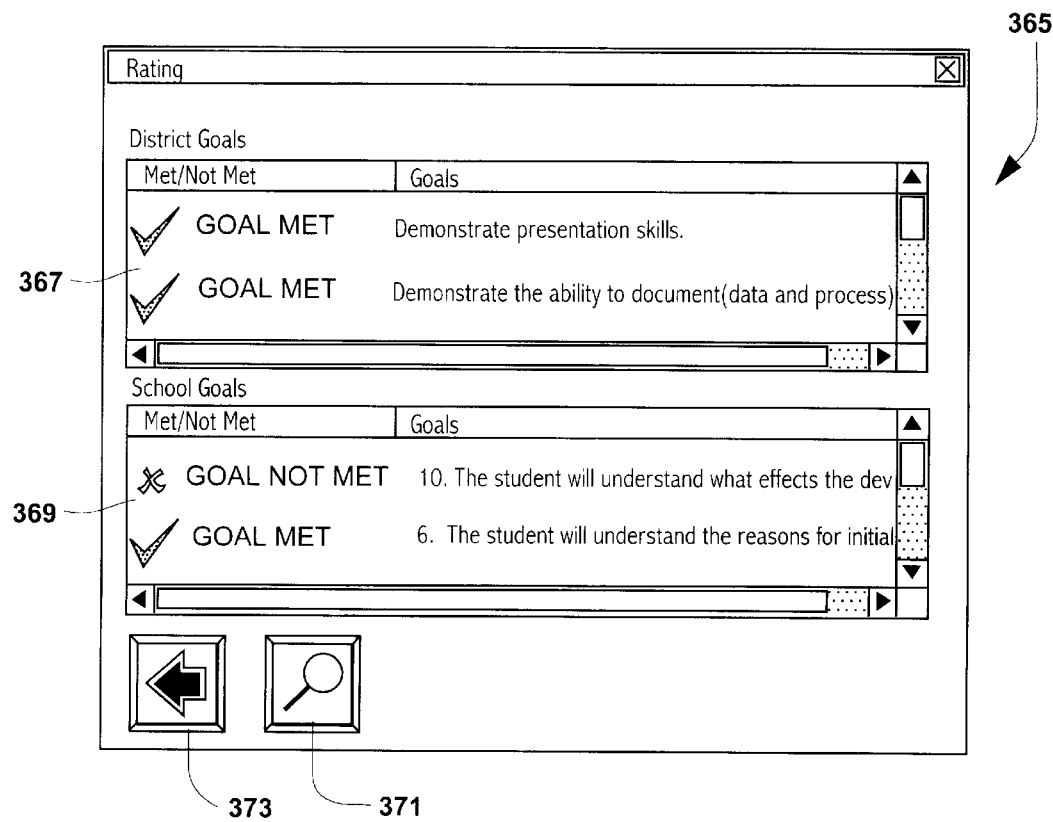
FIG. 44 is an illustration of a feedback for a portfolio task screen.

Referring to FIG. 44, a rating or evaluation screen illustration is shown at 365 and permits a user to view the rating or evaluation provided for a selected task or evaluation which is made by a teacher. The rating/evaluation screen 365 includes a district goals evaluation portion 367, a school/curriculum goals evaluation portion 369, a view specific goals in full content detail button 371 and a go back button 373.

Figure 12:
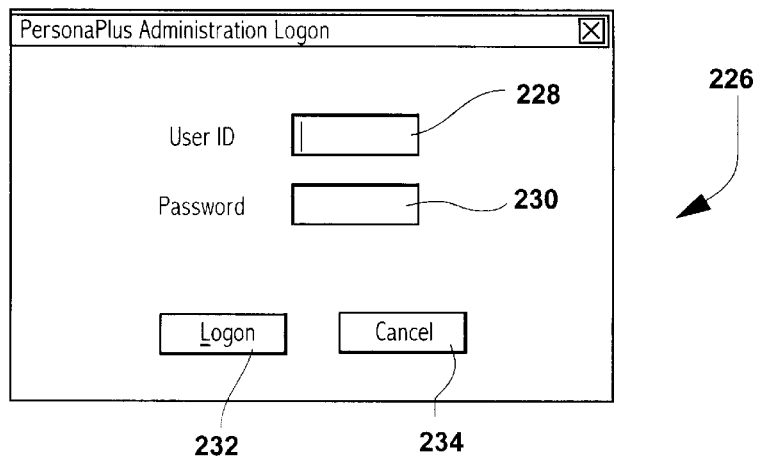
FIG. 12 is an illustration of an administrators logon screen according to a preferred embodiment of the present invention.

Referring now to FIG. 12, an administrator's logon screen is illustrated at 226 for use by a school administrator and includes key entry portions for a user I.D. at 228 and a password at 230 which ensures only specified individuals will have access to the system. A logon button 232 is provided to proceed to a next succeeding screen display and a cancel button is provided at 234. The purpose of the administrative aspects of the program and system is to facilitate the ability of certain administrative officials currently involved in student education to monitor the progress of students in a cooperative fashion with teachers and to provide a more convenient medium for involvement and interaction.

Figure 12A:
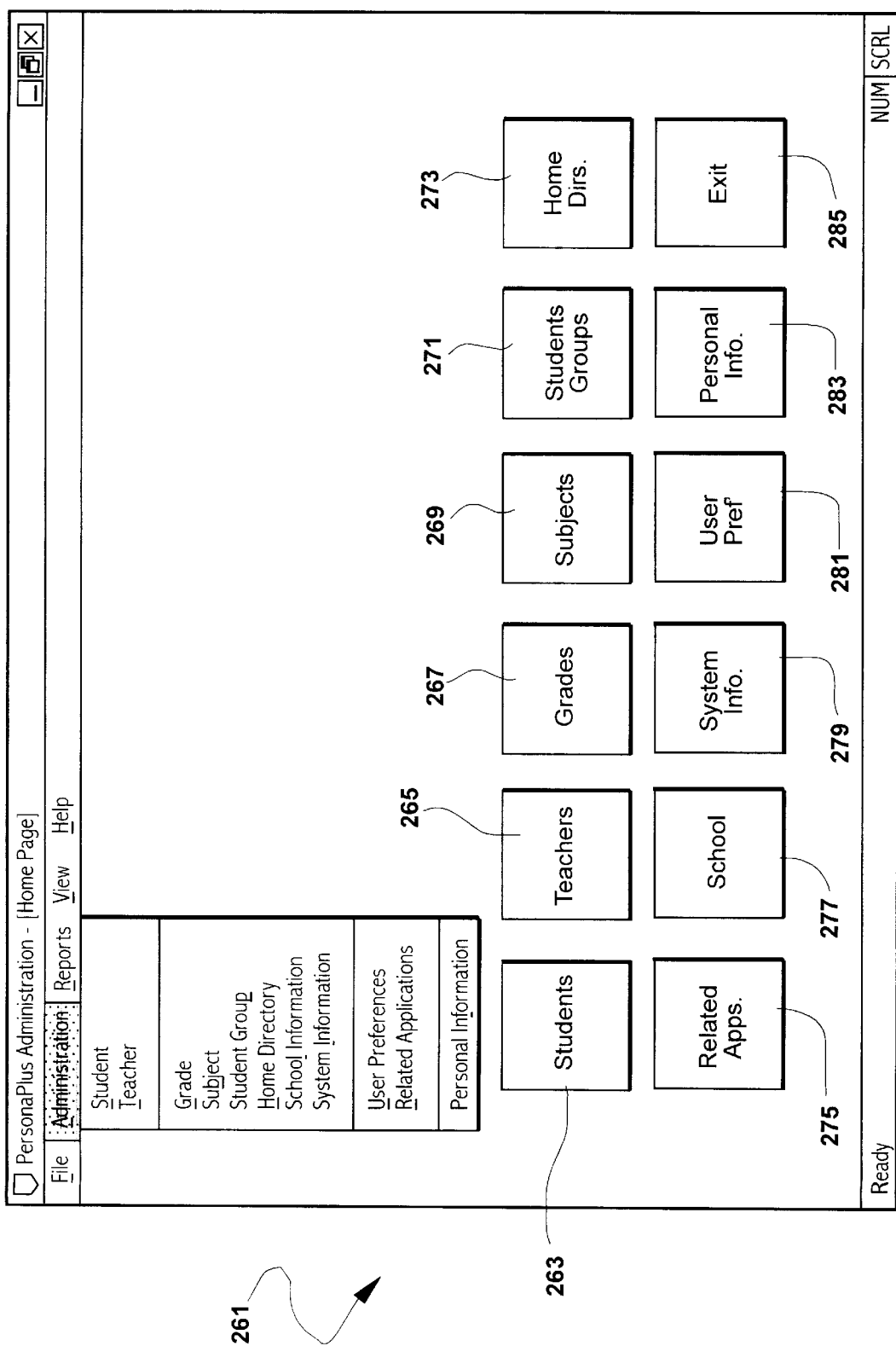
FIG. 12a is an illustration of an administration home page screen.

Referring to FIG. 12a, an administrator's home page 261 is shown for facilitating the administrative functions of the present invention. The administrator's home page 261 provides a plurality of individual icons accessible to the administrator including a student administration icon 263, a teacher administrative icon 265, a grade administration icon 267, a subject administration icon 269, a student groups administration icon 271, a home directories administration icon 273, a related applications administration icon 275, a school administration icon 277, a system information icon 279, a user preference maintenance icon 281, a personal information and maintenance icon 283 and an exit icon 285.

Figure 12B:
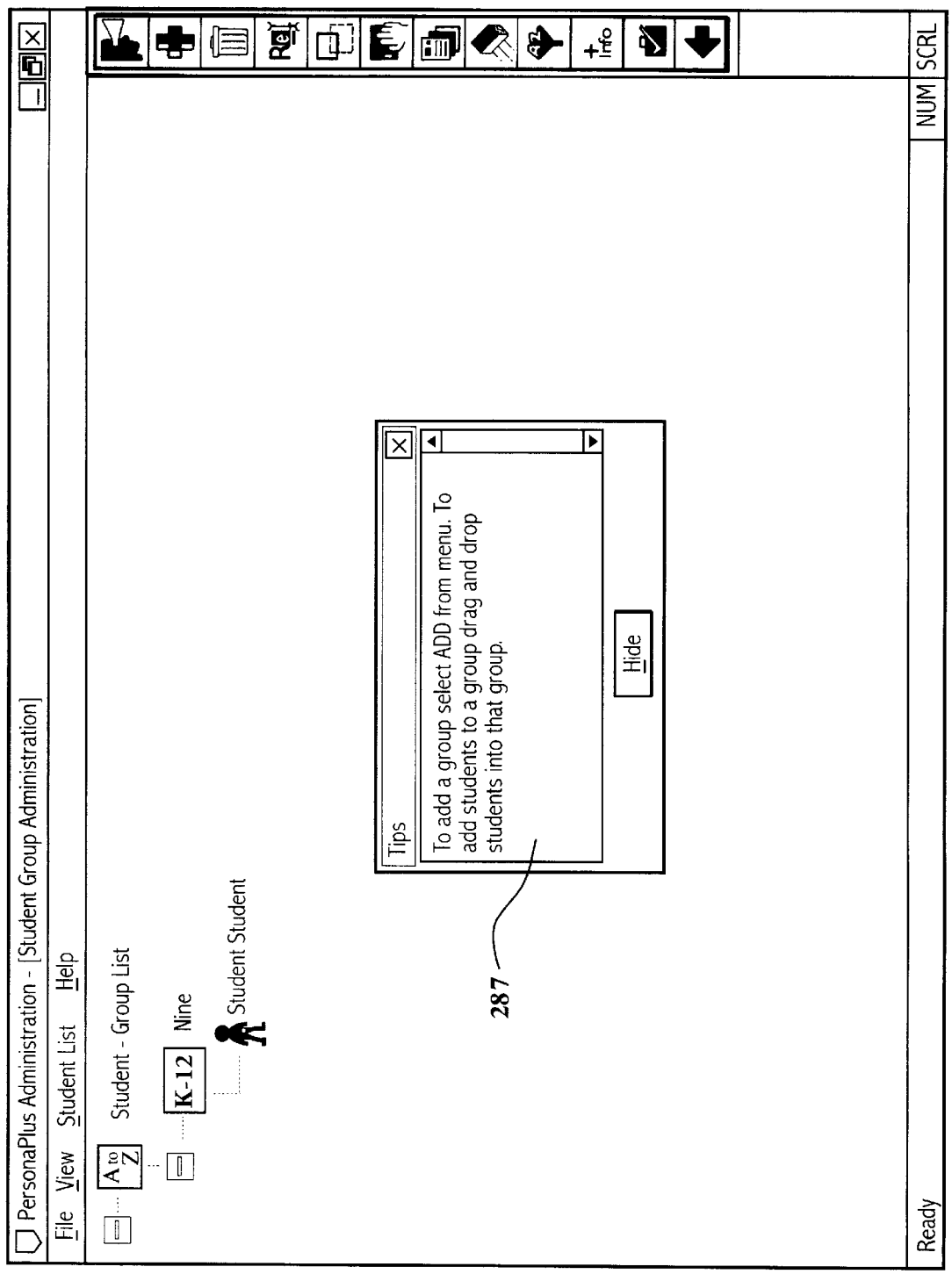
FIG. 12b is an illustration of a student group administration screen.
Figure 12C:
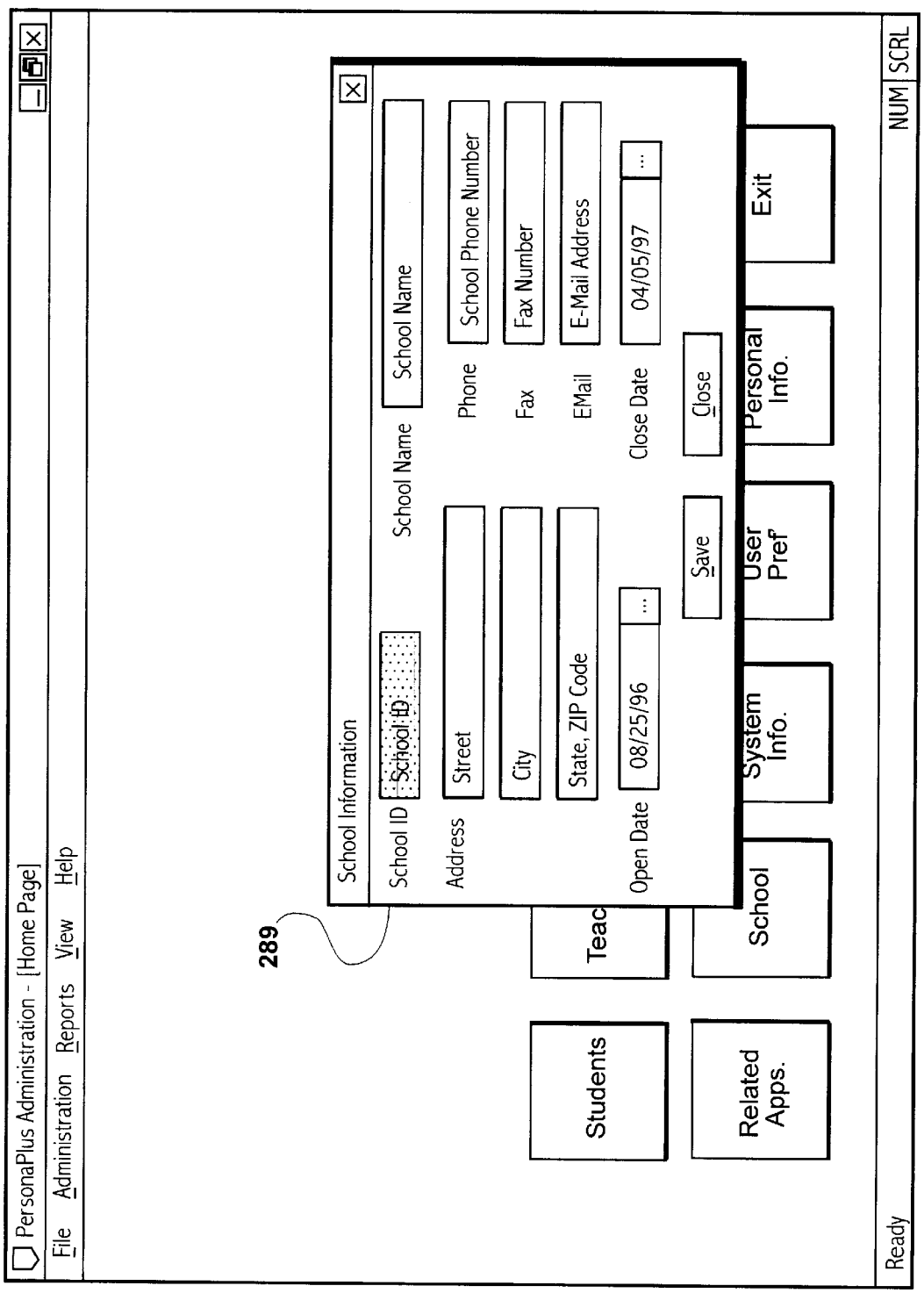
FIG. 12c is an illustration of a school information administration screen.
Figure 12D:
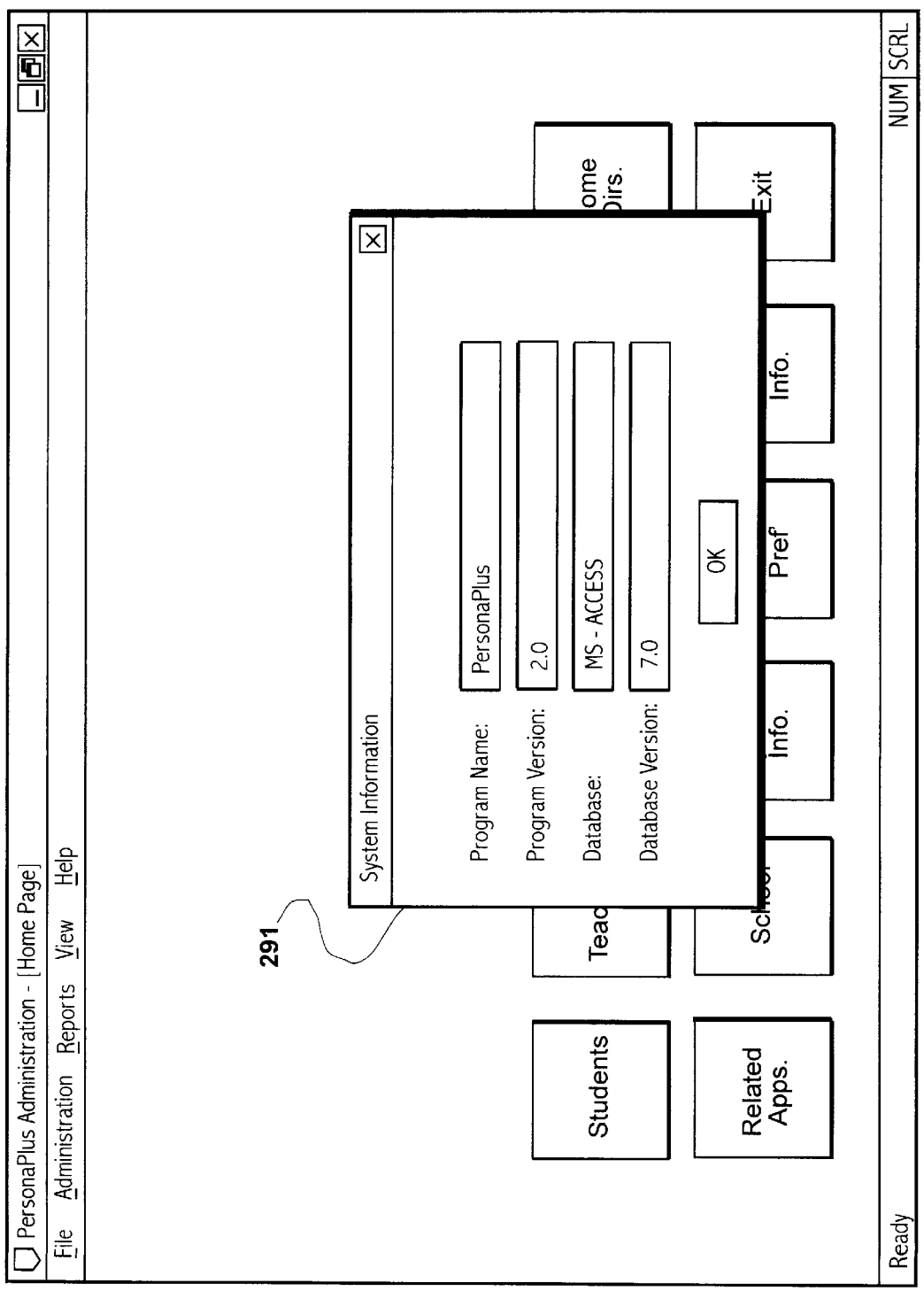
FIG. 12d is an illustration of a system information screen.
Figure 12E:
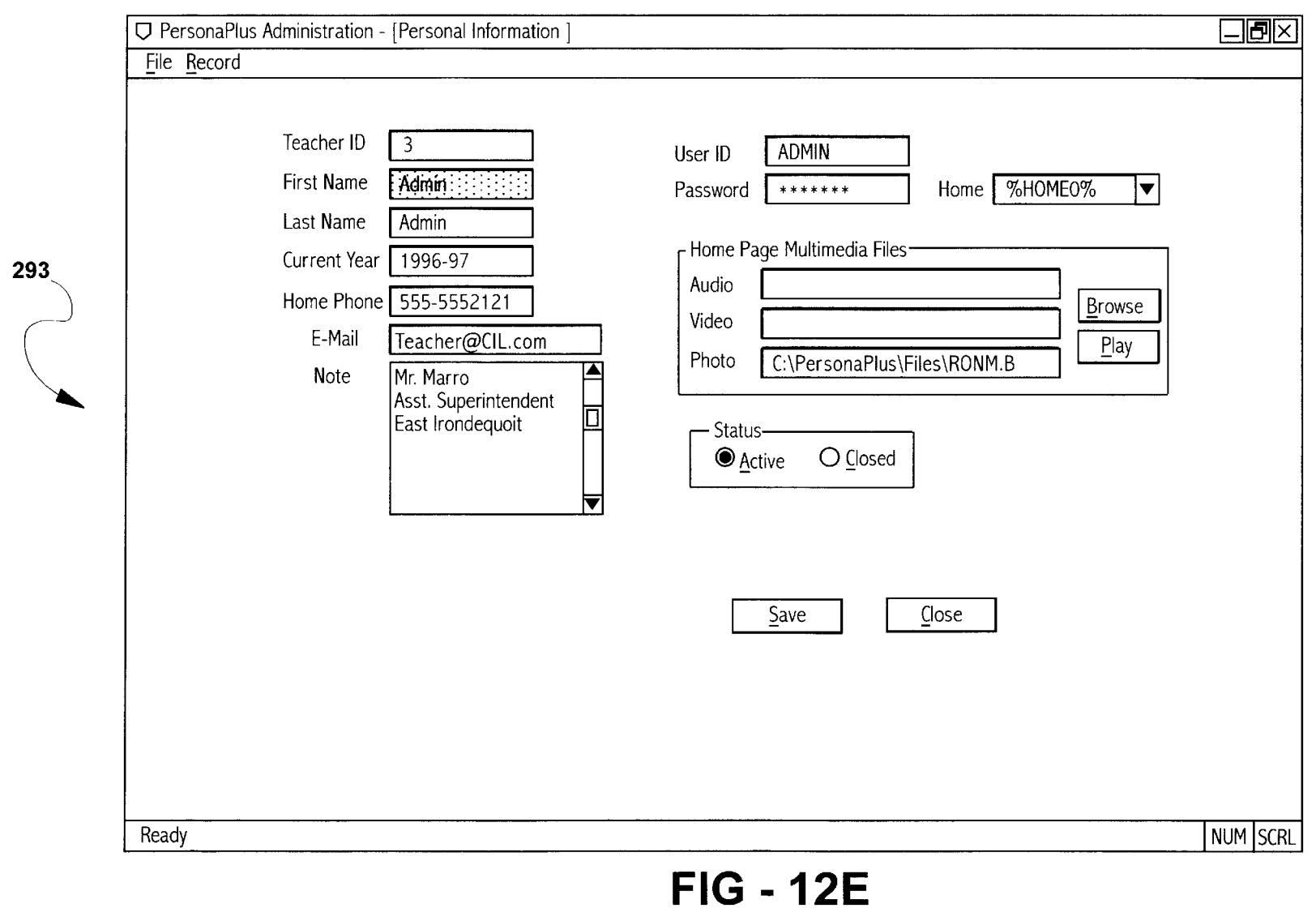

Referring further to FIGS. 12b through 12e, examples of individual windows are illustrated for selected of the icons shown in FIG. 12a. Specifically, FIG. 12b illustrates a student tips window 287 which informs the instructor how to operate the student groups administration function previously identified by icon 271 in FIG. 12a. FIG. 12c illustrates a school information window 289 which is accessible from school administration icon 277. Referring to FIG. 12d, a system information window 291 is shown which illustrates the information in the system information icon 279. Finally, FIG. 12e shows a personal information window 293 representative of the information retrieved upon clicking icon 283 in FIG. 12a.

Figure 13:
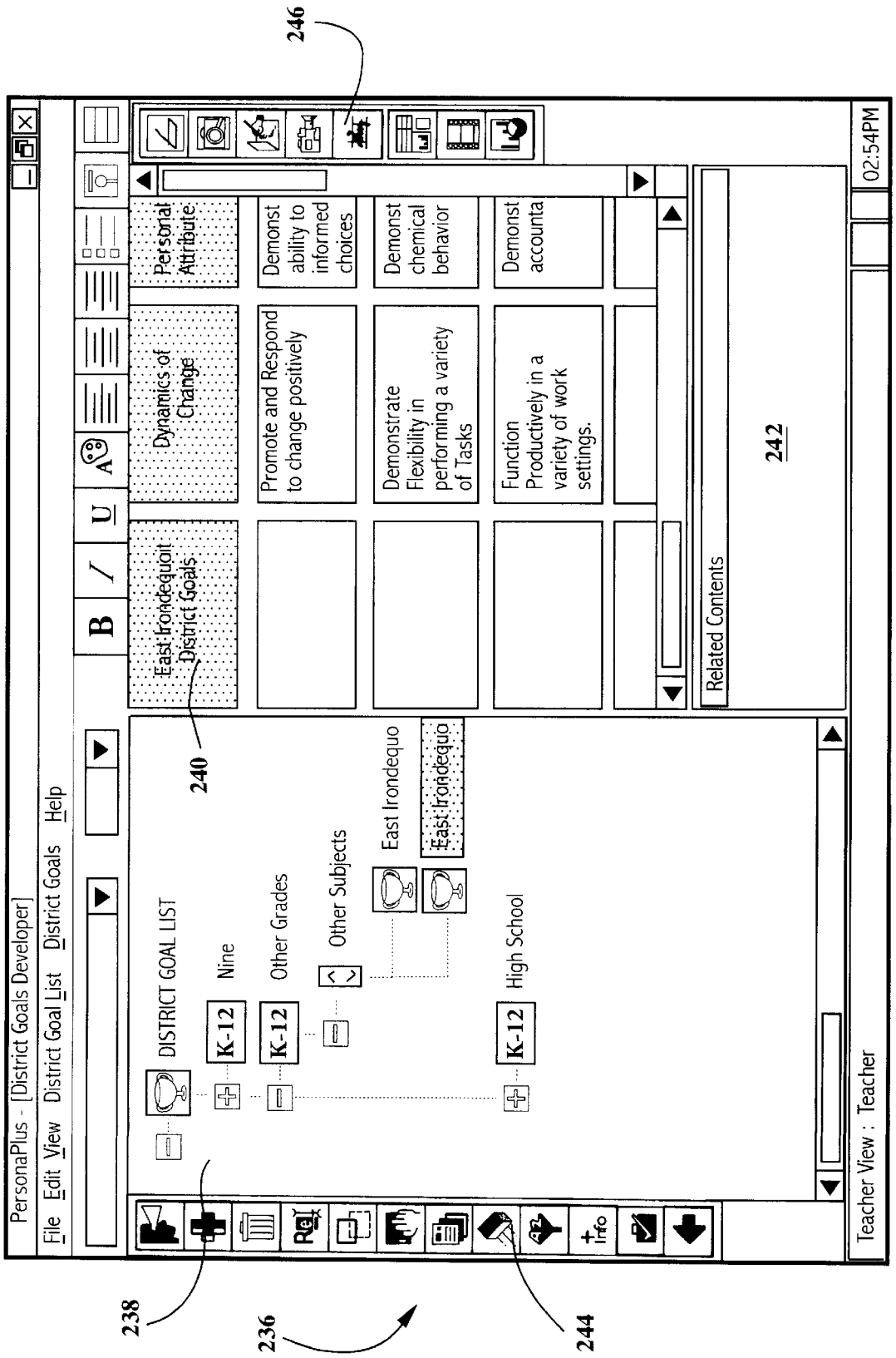
FIG. 13 is an illustration of a teacher/administrator viewable/modifiable district goals developer screen.

Referring to FIG. 13, a teacher and administrator accessible district goals developer screen is shown at 236 and includes a district goals list portion 238, a details portion 240 and a related contents portion 242. The definition of district goals are goals that are established by school/district/state governing bodies and which provide a basis for the standards which the students are educated under. Additional toolbars are illustrated at 244 and 246, with the toolbar 244 including program operating functions which the administrator/teacher may access in adding, deleting and modifying district goals and the toolbar 246 illustrating certain multi media inputtable items which may be accessed in the creation of customized digitized insertions for the district goals.

Figure 14:
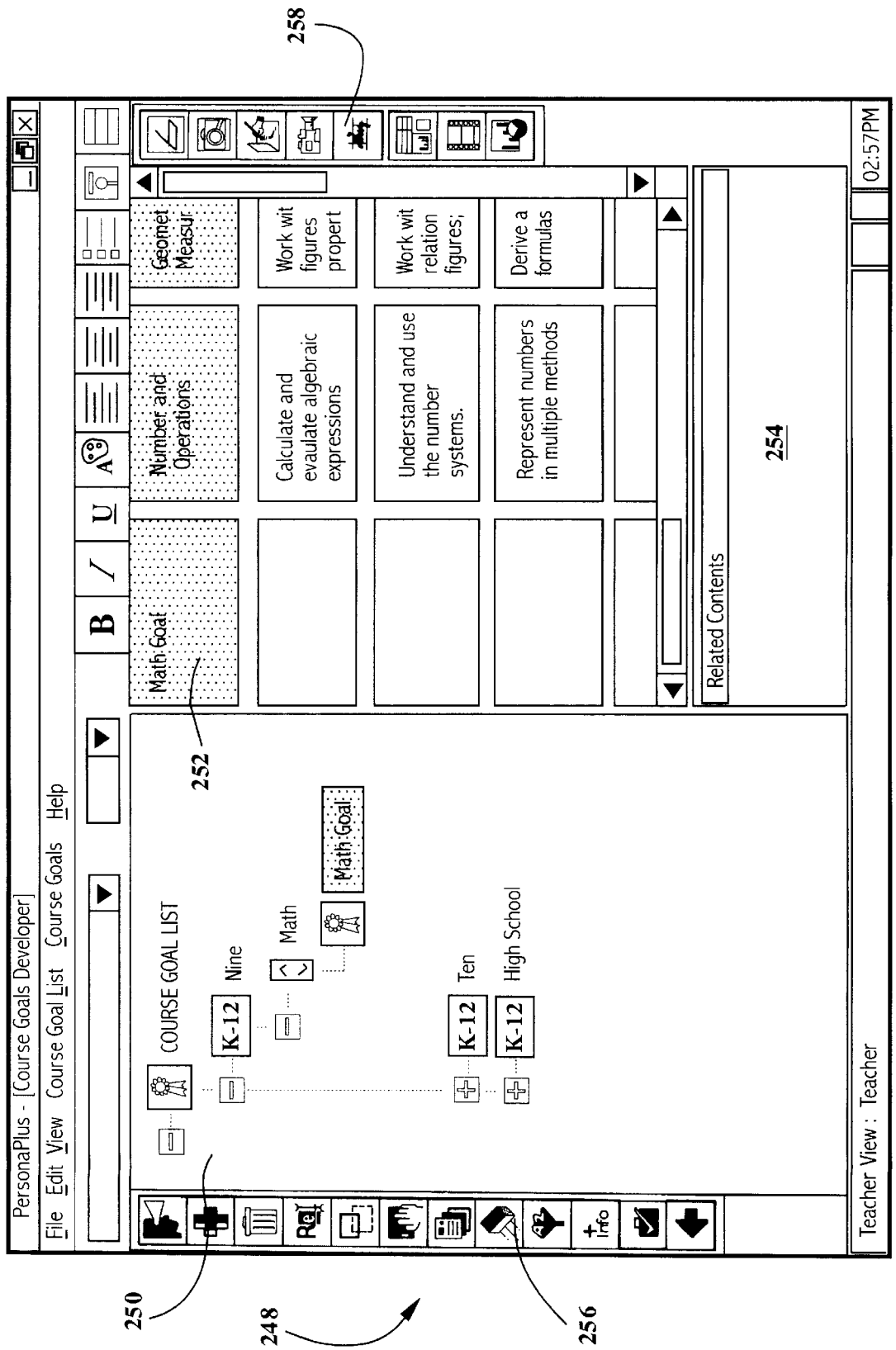
FIG. 14 is an illustration of a teacher/administrator viewable/modifiable curriculum goals developer screen.

Referring to FIG. 14, a teacher and administrator accessible curriculum goals developer screen is shown at 248 and includes a curriculum goals list portion 250, a details portion 252 and a related contents portion 254. The definition of curriculum goals are goals which are more specifically drawn to a given subject taught by the class and are much more narrow in scope than the broader district goals. Curriculum goals are typically a listing of the requirements for successfully completing a given academic subject and are usually created with the input of the teacher and local school administrator within the framework of the broader district goals. Toolbars 256 and 258 are again provided for assisting in the operation of the program and the accessibility of outside multi media sources, respectively, as previously described.

Figure 15:
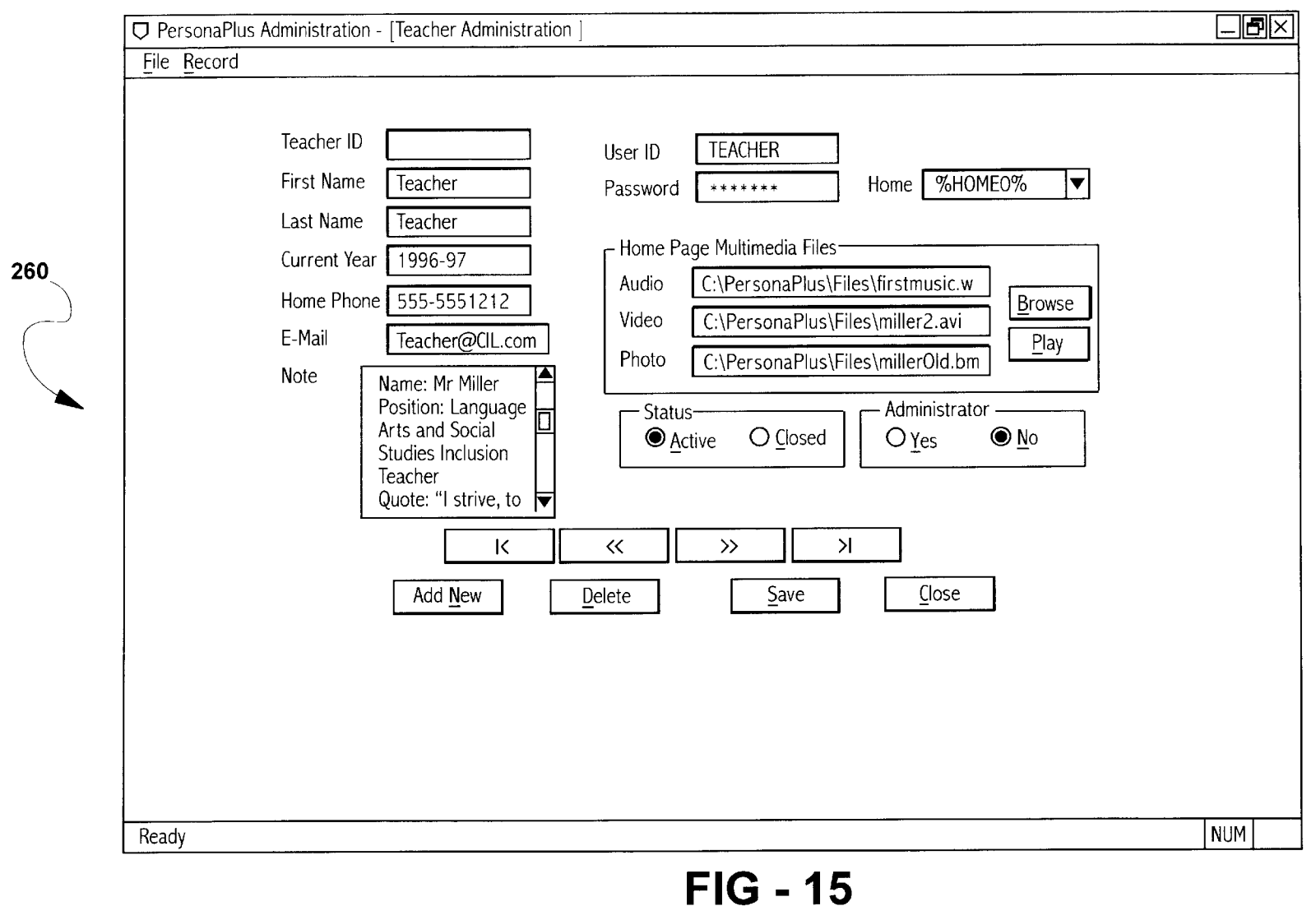
Figure 16:
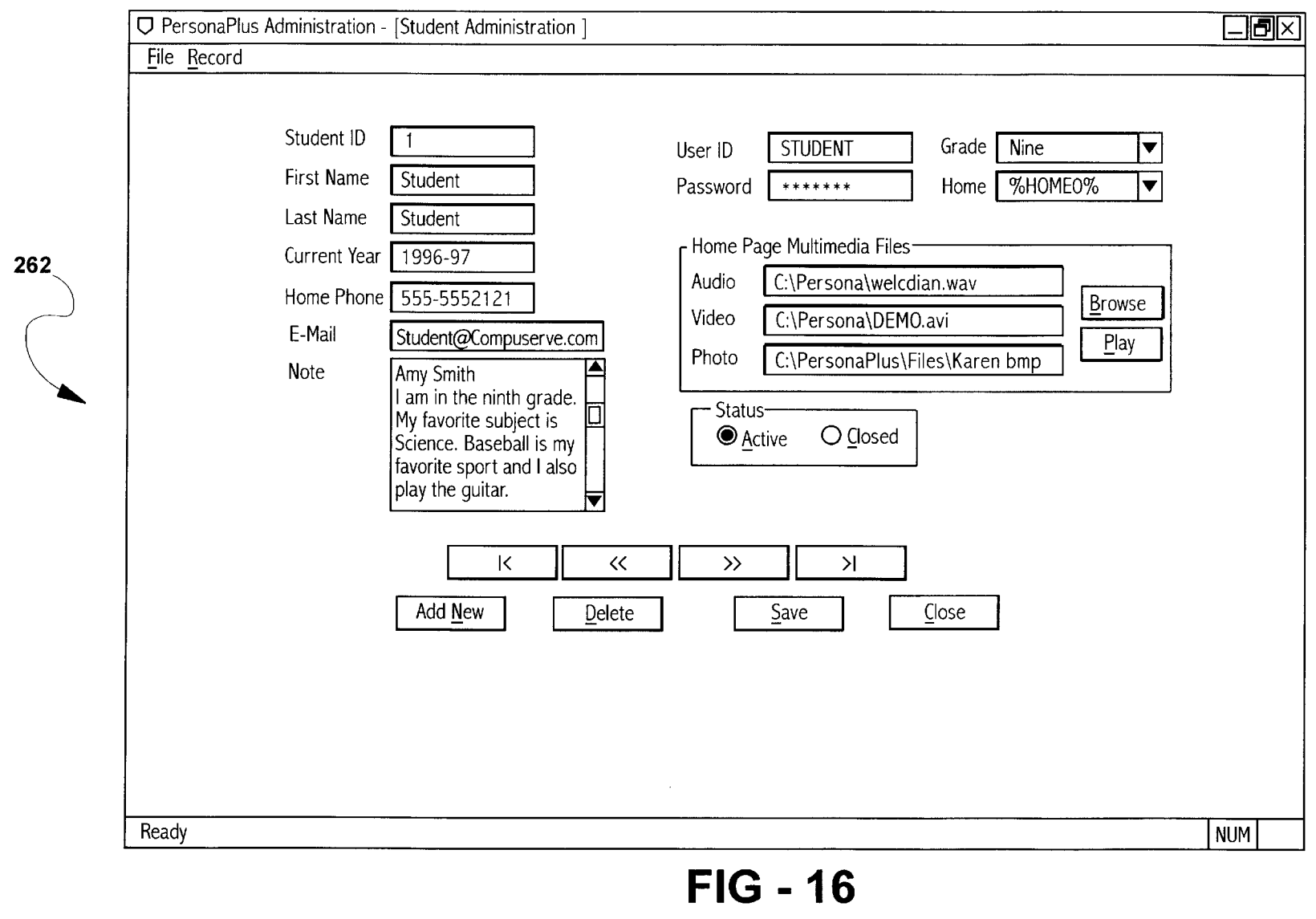

Referring now to FIG. 15, a teacher administration screen 260 is illustrated and lists biographical information of a selected teacher such as name, school year, address, phone etc., which are key enterable in a convenient format on the screen 260. Referring further to FIG. 16, a student administrator screen 262 is shown which likewise lists similar biographical information of a selected student. As is evident from the screen illustrations 260 and 262, additional information in the form of personalized notations and other identifying information may be entered.

Figure 17:
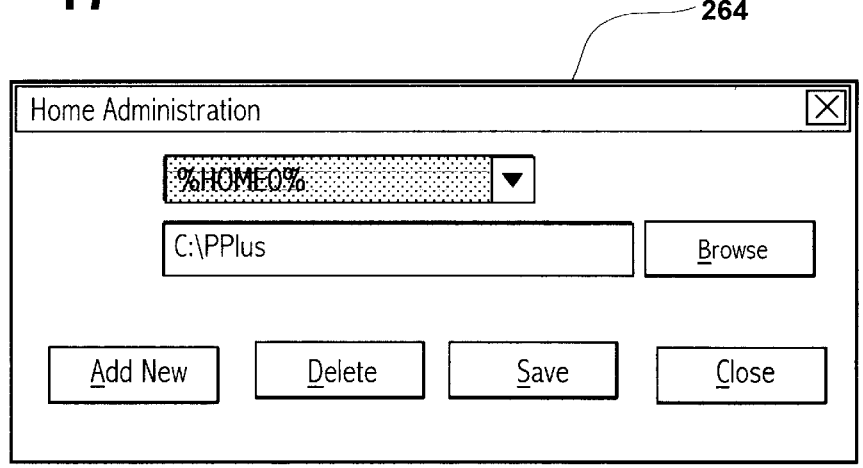
FIG. 17 is an illustration of a home directories administration screen.
Figure 18:
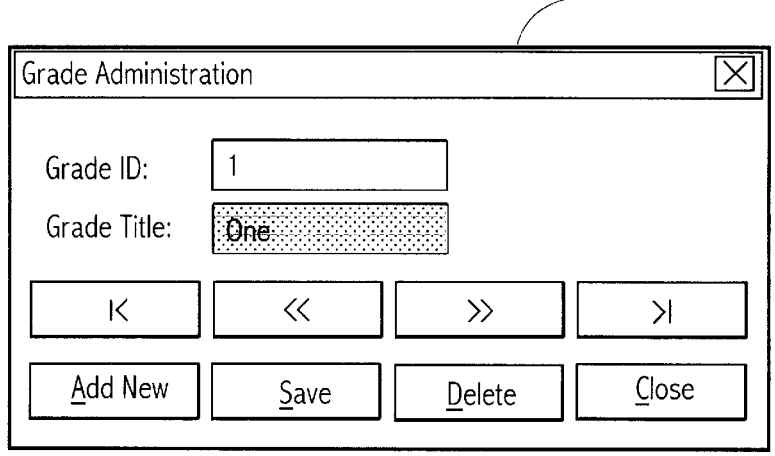
FIG. 18 is an illustration of a grade administration screen.

Referring to FIG. 17, a home directories administration screen 264 is shown for providing a listing of the accessible directories which store the program according to the preferred embodiment of the present invention. Referring further to FIG. 18, a grade administration screen 266 is shown which permits a system administrator to maintain grade records in the program and to maintain access to all grade records which are used. The system administrator can add a new grade, delete a grade or modify the title for a grade.

Figure 19:
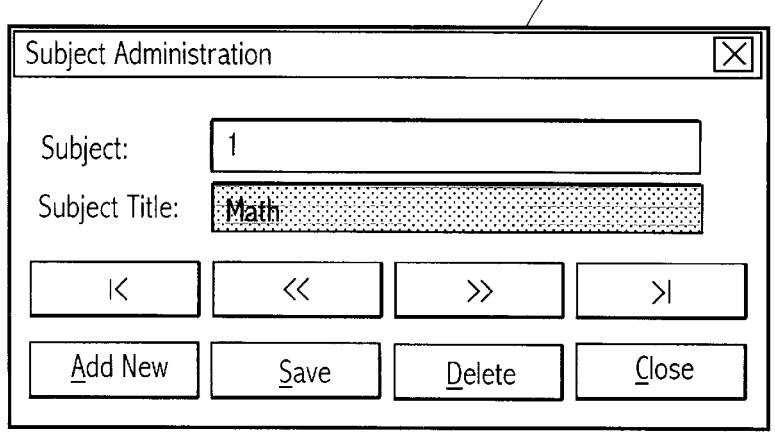
FIG. 19 is an illustration of a subject administration screen.
Figure 20:
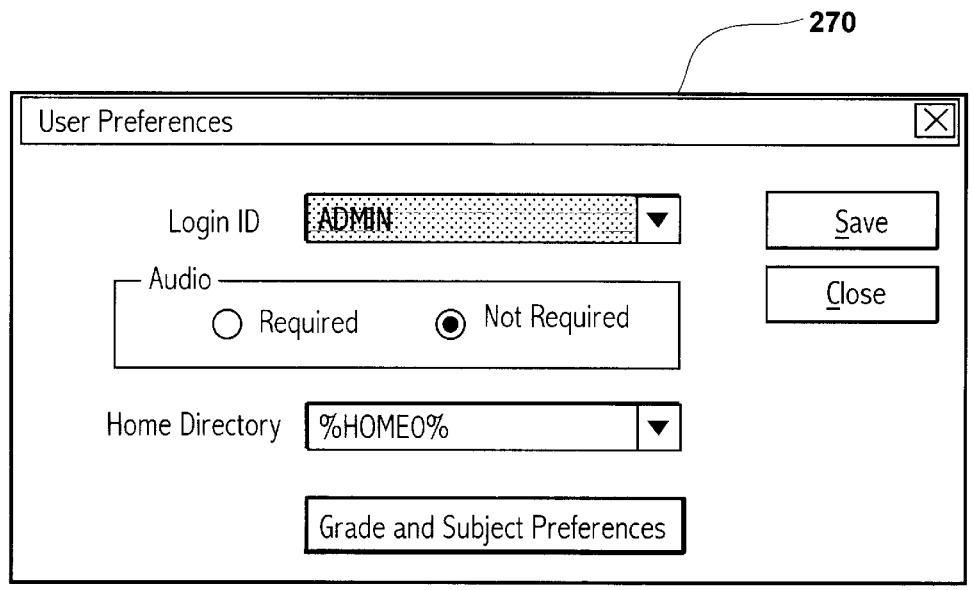
FIG. 20 is an illustration of a user preferences administration screen.
Figure 21:
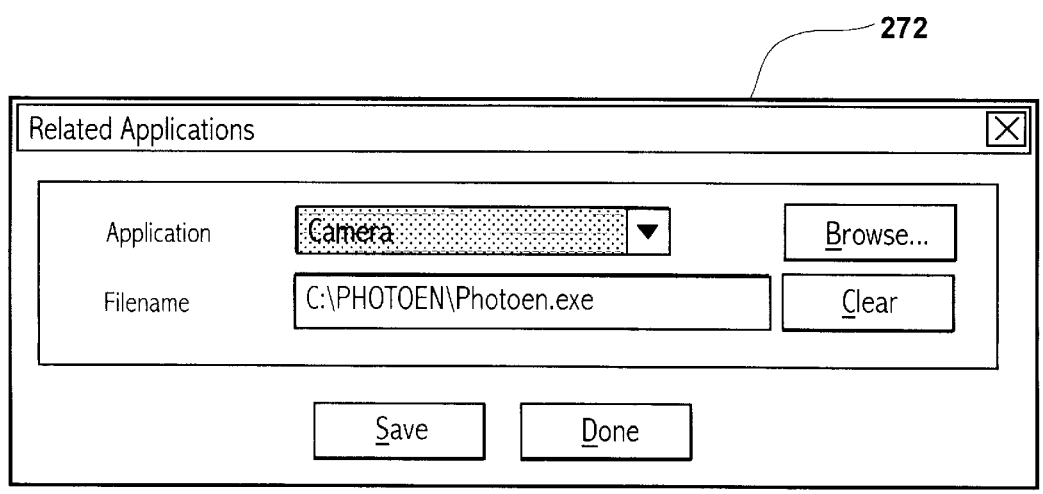
FIG. 21 is an illustration of a related applications administration screen.

Referring to FIG. 19, a subject administration screen 268 is illustrated and provides the system administrator with the further ability to maintain subject records and to maintain access to all subject records being used. The system administrator can add a new subject, delete a subject or modify the title for a subject. Referring to FIG. 20, a user preferences administration screen 270 allows the system administrator to maintain access to all those who are enrolled in the program and, by setting the user preferences, permits the viewer to see only a snapshot of the available grades and subjects in an orderly format. Finally, referring to FIG. 21, a related applications administration screen 272 is shown which allows the system administrator access to all of the related application records within the program, such records normally consisting of comments, assessments and any other miscellaneous and inputtable information.

Having previously described in considerable detail an operative embodiment of a software based operating program for practicing the interactive assessment system and process and computer writable media according to the present invention, an explanation of the following process flow steps in practicing the invention will be helpful in illustrating its operative functions. Specifically, referring to FIG. 22, an overall process flow diagram is shown at 274 and includes a beginning step 276. After signing on at step 278, the user proceeds to exit step 280 and, if it is desirable to exit the system, exits at step 282. If not, the user proceeds to step 284 which queries whether the student home page is to be accessed. If the answer to query 284 is yes, the student proceeds to student home page 286 or, if the answer is no, proceeds to a query for the teacher home page at 288. If the answer to query 288 is yes, the user proceeds to teacher home page 290 and, if no, to a display error step 292 which reroutes the process back to sign on step 278.

Figure 22:
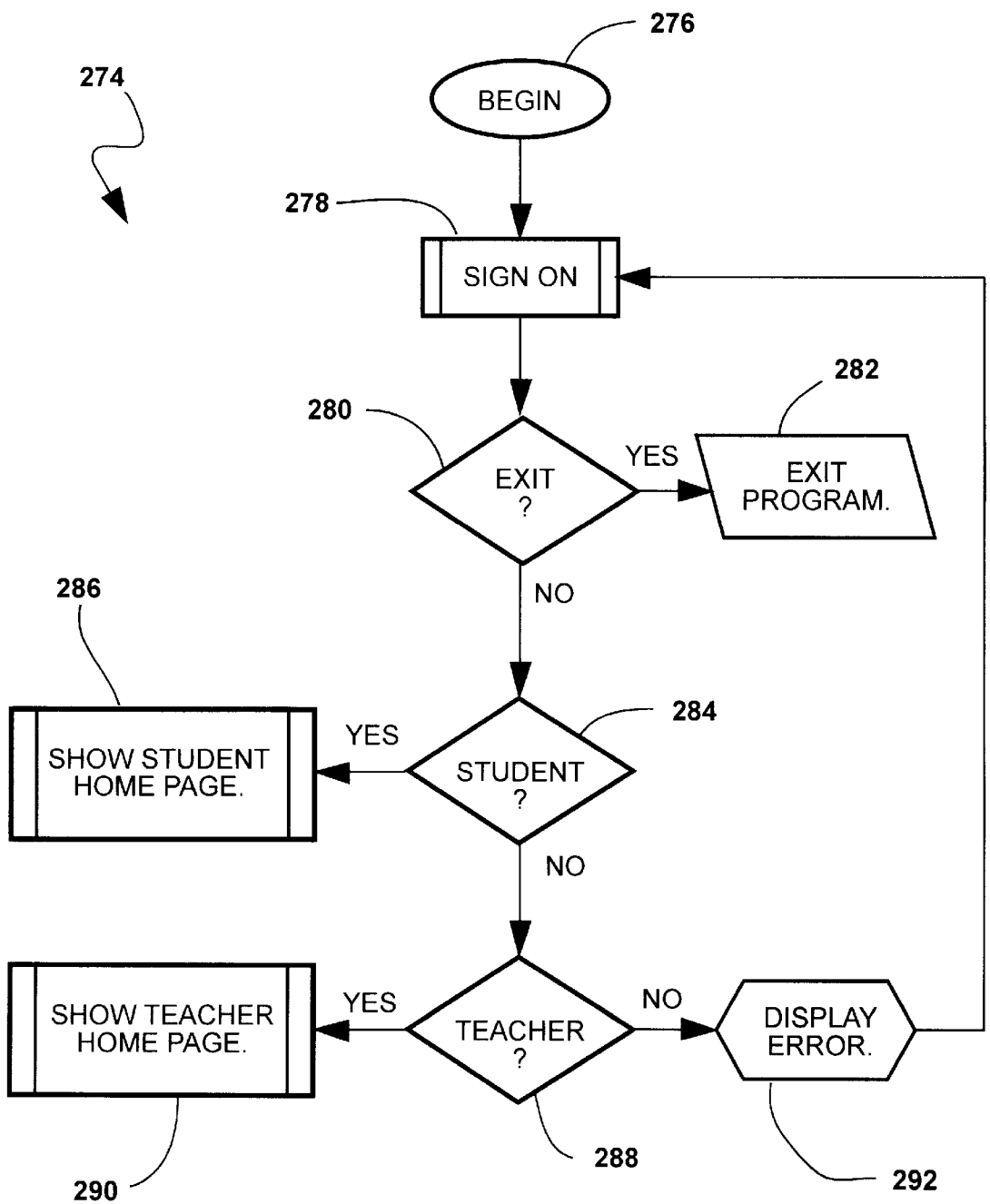
FIG. 22 is a process flow diagram of the interactive multimedia performance assessment system and process according to the present invention.
Figure 23:
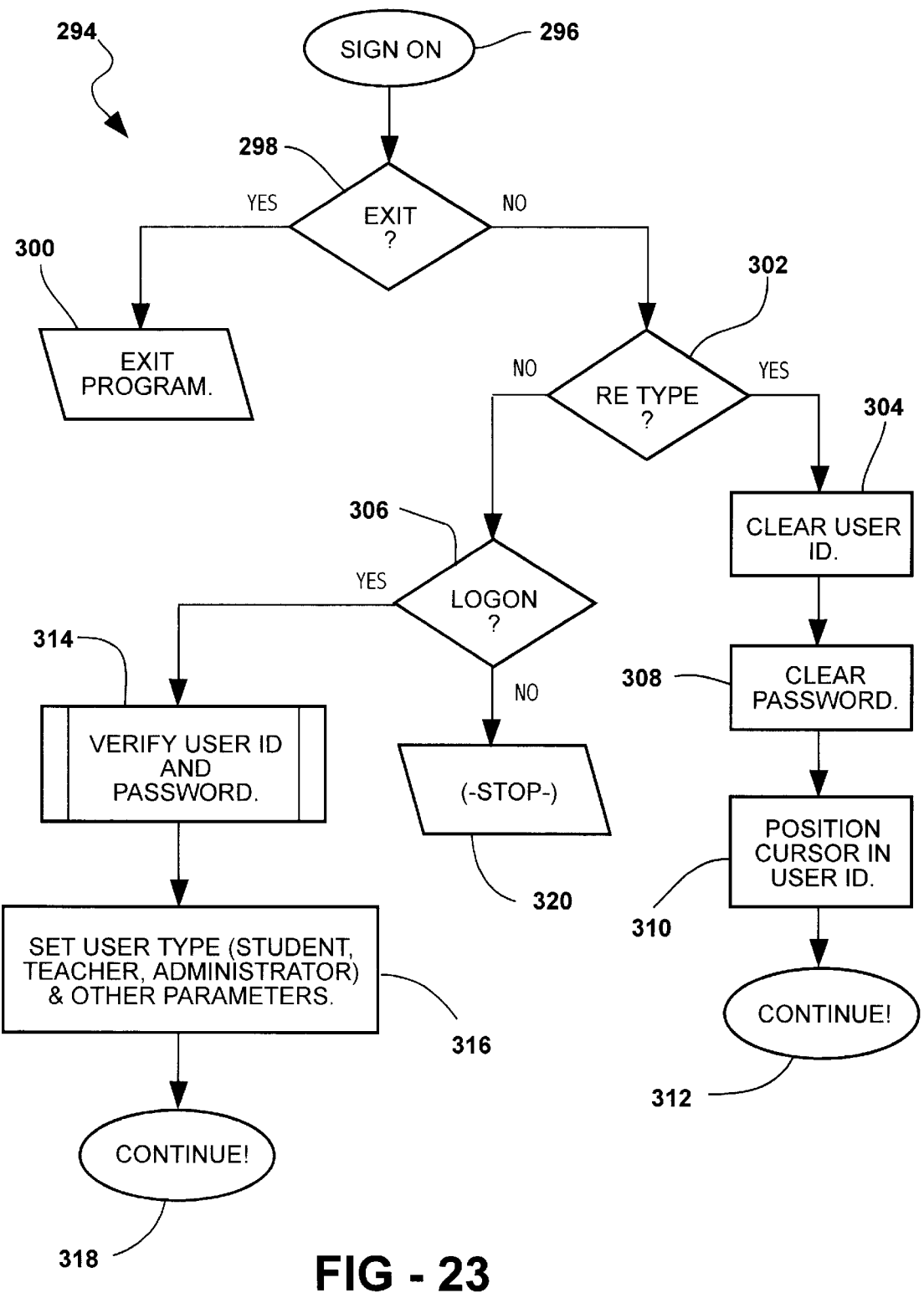
FIG. 23 is a process flow diagram of a login process subroutine of the flow diagram illustrated in FIG. 22.

Referring to FIG. 23, a subset flow diagram is shown at 294 of the sign on step illustrated at 278 in FIG. 22. According to FIG. 23, a user proceeds from sign on step 296 to query 298 as to whether to exit the system. If the answer to query 298 is yes, the user exits the program at step 300 and, if no, proceeds to re-type query step 302. If the answer to query step 302 is yes, the user proceeds to clear user I.D. step 304 and, if the answer is no, the user proceeds to logon step 306. From clear user I.D. step 304, the user clears his/her password at step 308, positions the key cursor in user I.D. at step 310 and continues on at step 312. If the answer to query step 302 is no, the user proceeds to the logon query step 306, at which point if the answer is yes proceeds to a verify user I.D. and password step 314 and, if the answer is no, proceeds to a stop step 320. From step 314 the user proceeds to a set user type (student, teacher, administrator) and other parameters step 316 and subsequently to a continue step 318.

Figure 24:
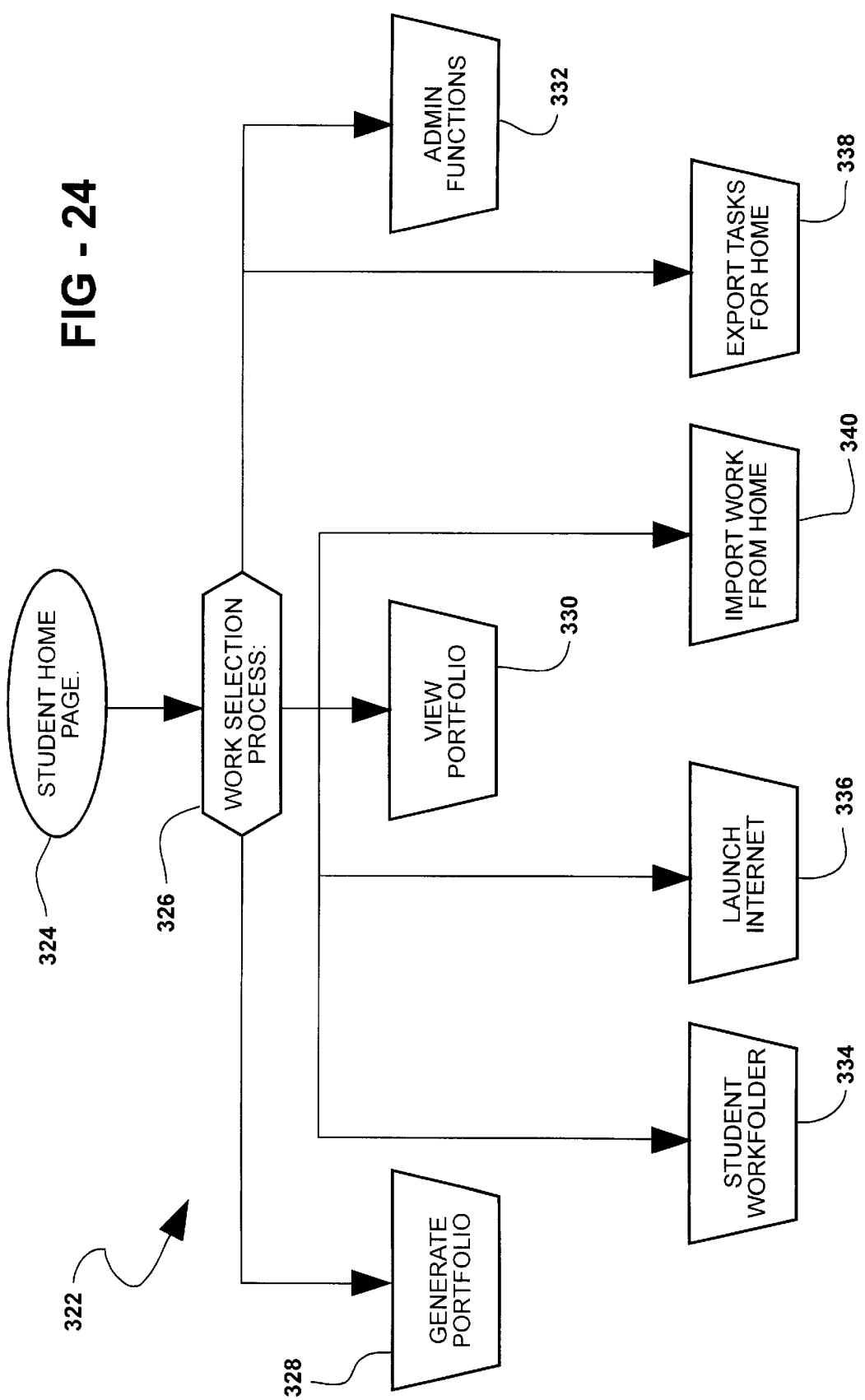
FIG. 24 is a process flow diagram of a student home page and work selection process according to the performance assessment system and process of the present invention.

Referring to FIG. 24, a flow diagram of student home page is shown at 322 and corresponds to step 286 of FIG. 22. According to FIG. 24, a user proceeds from student home page 324 to a work selection process step 326. The work selection process step 326 is a generalization of the numerous functional capabilities of the system and writable media of the present invention and includes the previously described functions such as portfolio generation at step 328, portfolio viewing at step 330, administration functions at step 332, student workfolder access at step 334, internet connection at step 336, export tasks at step 338 and import tasks at step 340. each of the preceding functions has been described in detail in the previous explanation of the various screen displays according to a preferred embodiment so that a further description here is unnecessary.

Figure 25:
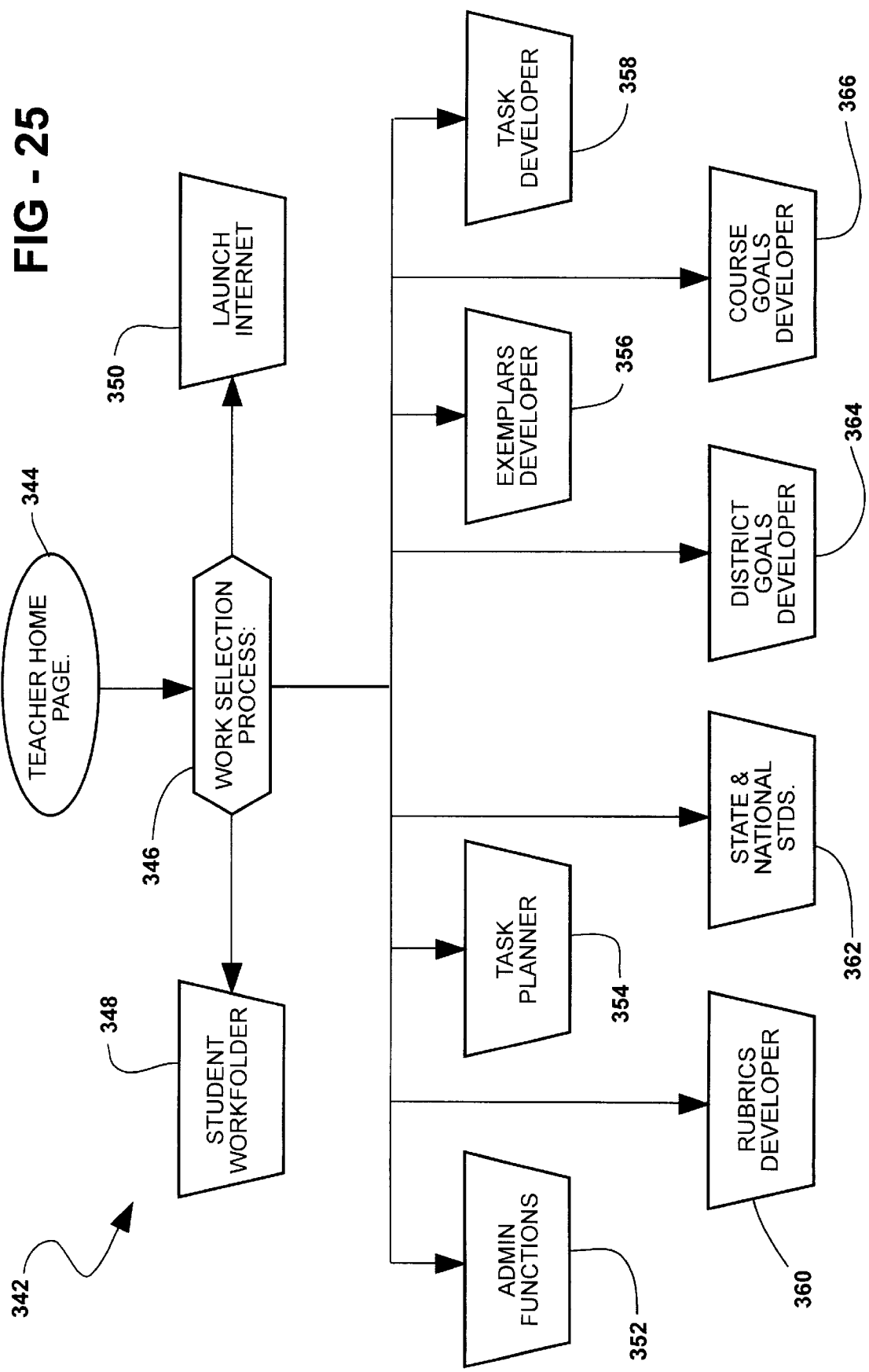
FIG. 25 is a process flow diagram of a teachers home page and work selection process according to the performance assessment system and process of the present invention.

Referring to FIG. 25, a flow diagram of a teacher home page is shown at 342 and corresponds to step 290 of FIG. 22. According to FIG. 25, a user proceeds from teacher home page 344 to a work selection process step 346. As with the discussion of the student home page functions in FIG. 24, the work selection process 346 permits a user to proceed to any one of a given number of varying menu options, such being a student workfolder at step 348, Internet connection at step 350, administration functions at step 352, task planner functions at step 354, exemplar development at step 356, task development at step 358, rubrics development at step 360, state and national standards step 362, district goals developer step 364 and course goals developer step 366. As was previously described, each of these functions is at the disposal of the teacher/administrator to effectively operate the system and writable media of the present invention and to perform the varying functions of establishing and implementing student assessment tasks, guidelines and feedback.

Figure 26:
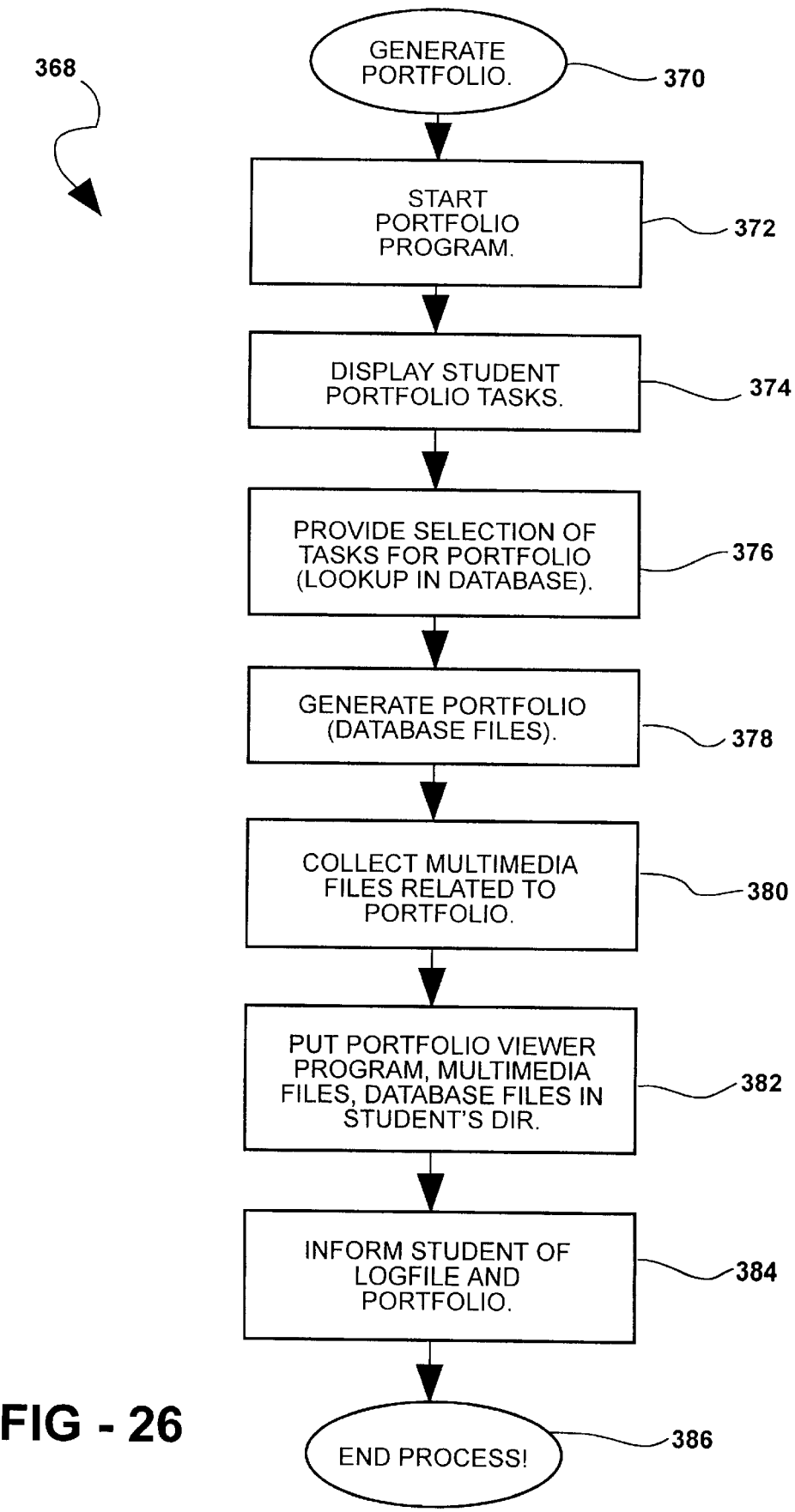
FIG. 26 is a process flow diagram for permitting a student to generate a multi media portfolio according to the present invention.

Referring now to FIG. 26, a portfolio generating process diagram is shown illustrating in more detail the student task step 328 in FIG. 24. According to FIG. 26, a student proceeds from generating portfolio step 370 to initiating a portfolio program at step 372. At step 374, the student displays the portfolio tasks and at step 376 accesses a database lookup table of tasks for the portfolio. At step 378, the user/student generates a portfolio from selected database files and at step 380 begins collecting multimedia files related to the portfolio. At step 382, the user establishes within the student directory a selection of a portfolio viewer program, multi media files and database files and at step 384 accesses logfile and portfolio information step. Finally, at step 386 the process according to 368 is terminated.

Figure 27:
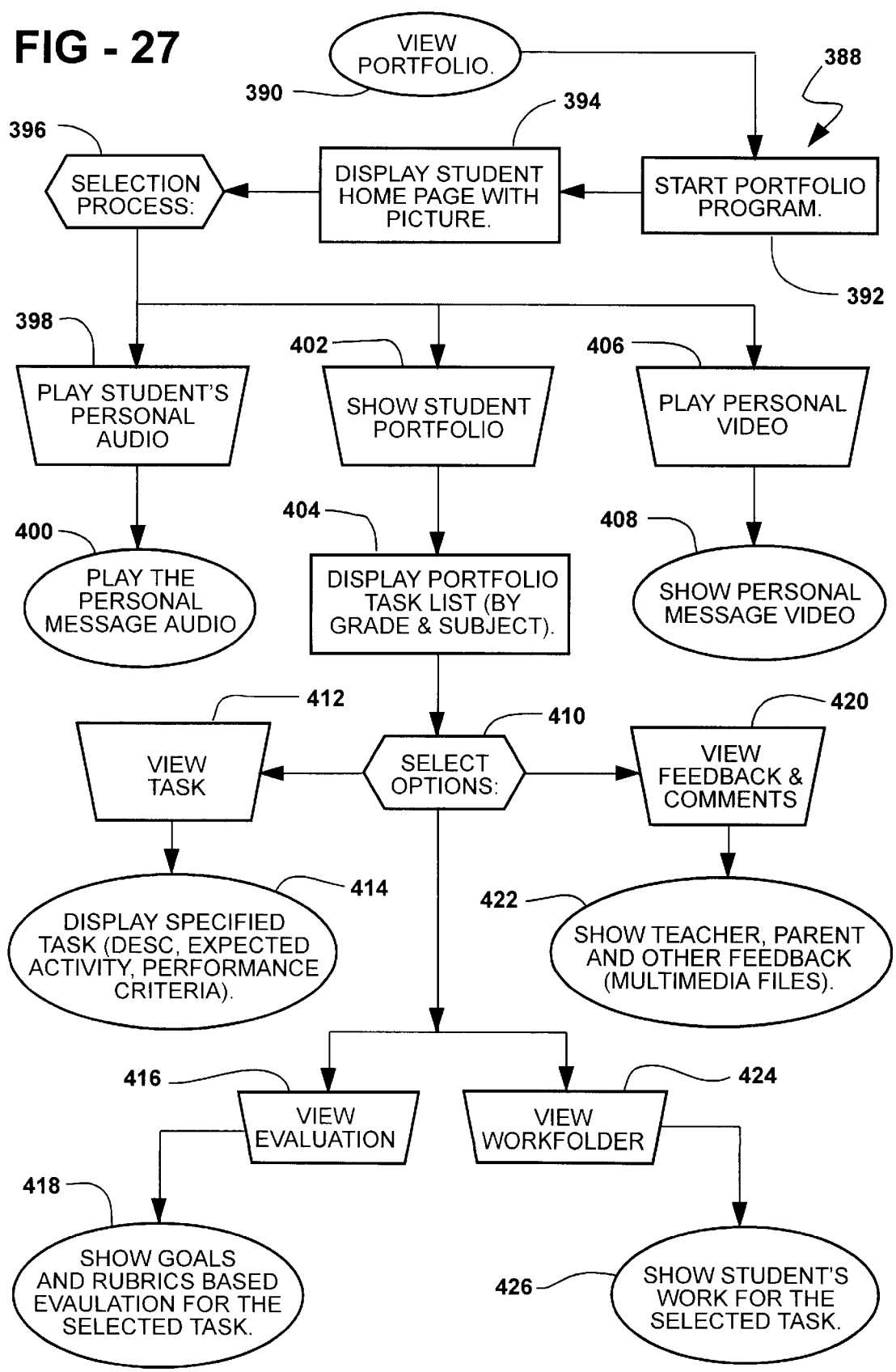
FIG. 27 is a process flow diagram for permitting a student to view a multi media portfolio generated according to FIG. 26.

Referring further to FIG. 27, a view portfolio scheme is shown at 388 in additional detail to step 330 in the student home page diagram of FIG. 24. According to FIG. 27, the user proceeds from view portfolio step 390 to a start portfolio program step 392. At step 394, the student home page and pictorial illustration is displayed and at step 396 a selection process is initiated. Selection process step 396 branches to a number of different steps, including a play student personal audio step 398 and play personal message audio step 400. Step 396 separately branches to a show student portfolio step 402 and display portfolio task list by grade and subject step 404 as well as to a play personal video step 406 and a show personal message video step 408. The display portfolio task list step 404 proceeds to a select options step 410, at which point the user decides on one of the following options, whether to proceed to view task step 412 and then to display specified task step 414, whether to proceed to view evaluation step 416 and then to show goals and rubrics based evaluation for selected task step 418, whether to proceed to view feedback and comments step 420 and then to show teacher, parent and other feedback step 422 and, finally whether to proceed to view workfolder step 424 and to show student's work for selected task step 426.

Figure 28:
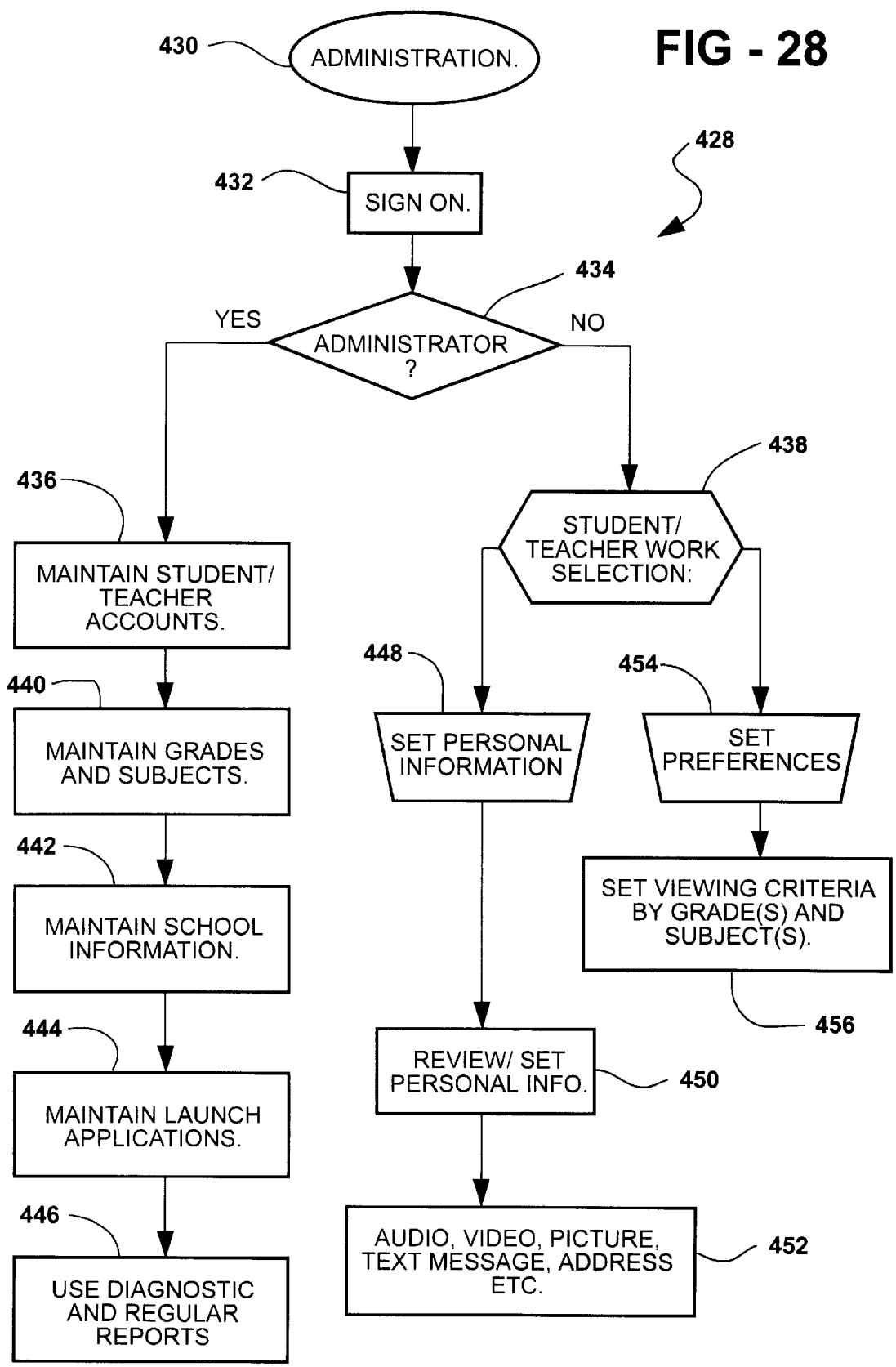
FIG. 28 is a process flow diagram illustrating administrative functions which is accessible from both teacher and student home pages.

Referring now to FIG. 28, an administrative flow diagram is illustrated at 428 for showing in more detail the administrative functions step 352 of the teachers home page of FIG. 25. According to FIG. 28, a user (typically a student administrator) proceeds from administration step 430 to sign on step 432. At step 434, it is queried whether the user is an administrator. If the answer to query 434 is yes, the administrator proceeds to step 436 and, if the answer is no, the student/teacher proceeds to step 438.

At step 436 the administrator accesses a maintain student/teacher accounts function and at step 440 a maintain grades and subjects function. At step 442, the administrator accesses maintain school information step and then at step 444 a maintain launch applications step. Finally, at step 446 a use diagnostic and regular reports step is illustrated.

At step 438, a student/teacher work selection function is indicated and proceeds in one instance to a set personal information step 448, a review/reset personal information step 450 and finally an audio, video, pictorial, text message and address information step 452. In an alternative instance, step 438 proceeds to a set preferences step 454 and finally a set viewing criteria by grade and subject step 456.

Figure 29:
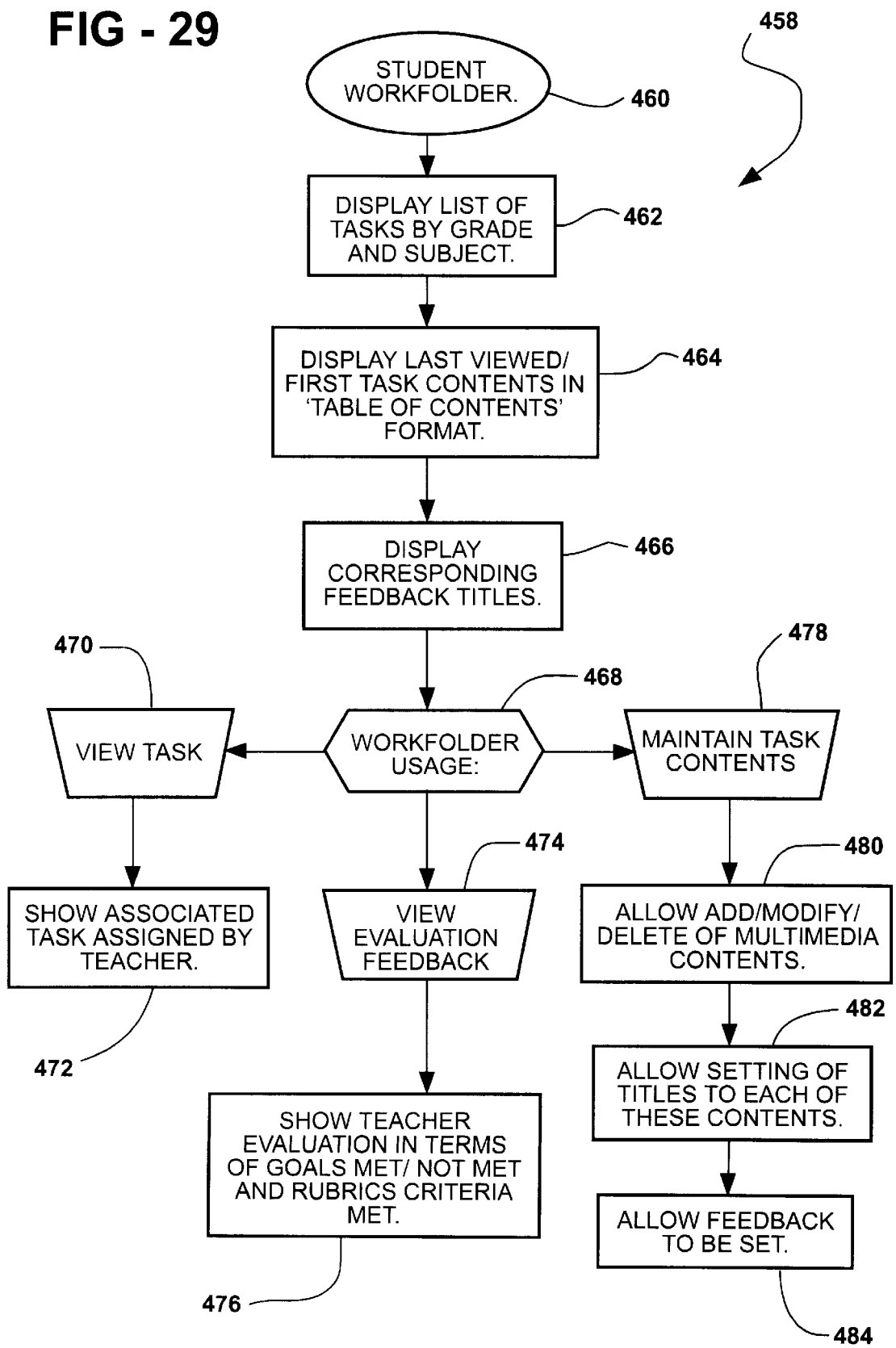
FIG. 29 is a process flow diagram illustrating a student workfolder according to the performance assessment system and process of the present invention.

Referring now to FIG. 29, a student workfolder flow diagram is illustrated at 458 and corresponds to step 334 of the student home page flow diagram of FIG. 24. Referring again to FIG. 29, a student proceeds from the student workfolder step 460 to a display list of tasks by grade and subject step 462 and then to a display last viewed first task contents (Table of Contents) format at step 464. At step 466, a display corresponding feedback titles function is illustrated and at step 468 a workfolder usage step is illustrated. The workfolder usage step 468 proceeds in one of three directions, firstly to a view task step 470 and then a show associated task assigned by teacher step 472, secondly to a view evaluation feedback step 474 and then to a show teacher evaluation in terms of goals met/not met and rubrics criteria met step 476 and, thirdly, to a maintain task contents step 478, allow add/modify/delete multi media contents step 480, allow setting of titles to each of contents step 482 and, finally, to an allow feedback to be set step 484.

Figure 30:
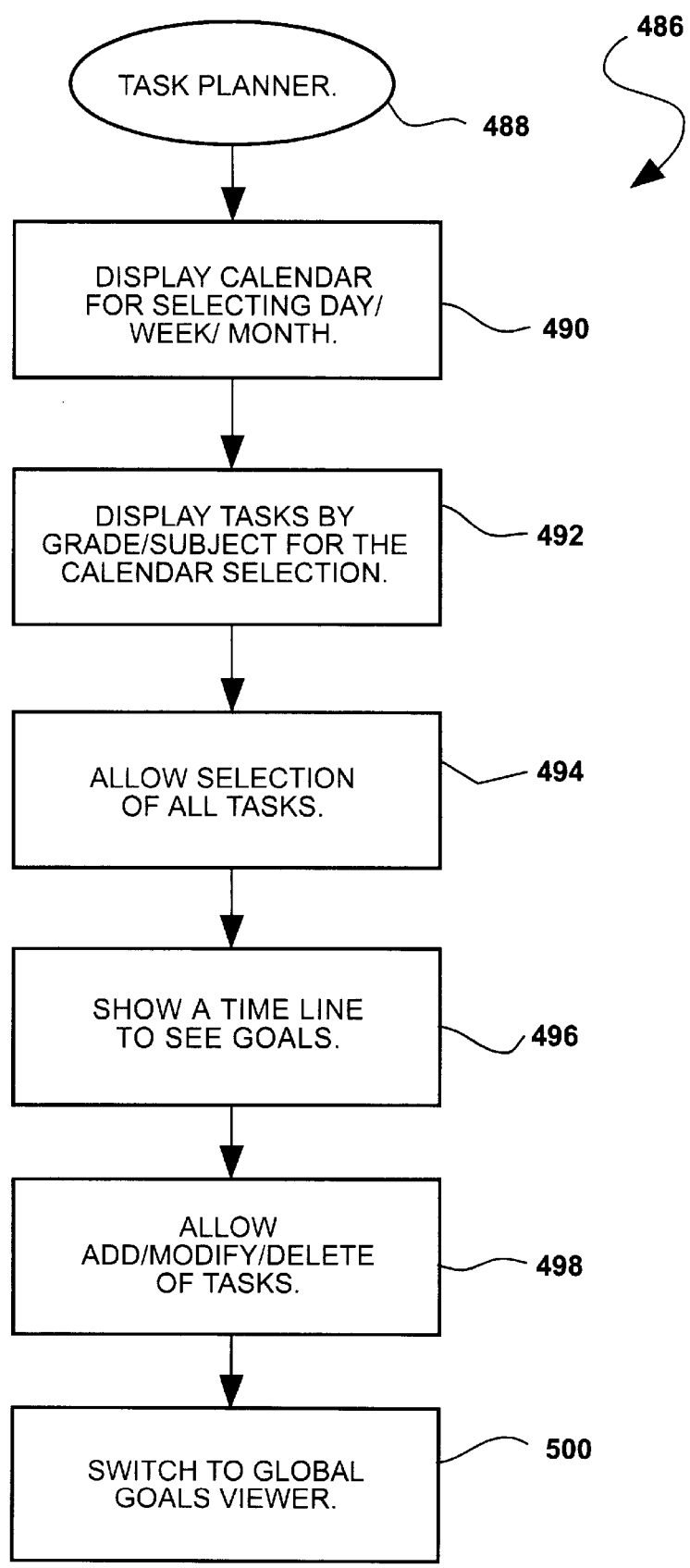
FIG. 30 is a process flow diagram of a task planner for use by teachers according to the performance assessment system and process of the present invention.

Referring to FIG. 30, a task planner flow diagram is shown at 486 and corresponds to step 354 of the teacher home page flow diagram of FIG. 25. Referring again to FIG. 30, the user proceeds from task planner step 488 to a display calendar for selecting day/week/month step 490, a display tasks by grade/subject for calendar selection step 492 and an allow selection of all tasks step 494. At step 496, a show a time line to see goals function is provided and proceeds to an allow add/modify/delete of tasks step 498 and finally to a switch to global goals view step 500.

Upon reference to the flow diagrams, particularly of the student and teacher home pages of FIGS. 24 and 25, additional step functions are listed which for purposes of brevity have not been outlined in their entireties beyond the generate portfolio, view portfolio, administration, student workfolder and task planner diagrams which are representative of some of the more important functions of the interactive multi media system and process according to the present invention. Upon reference to the diagrams of FIGS. 21 through 29, it is more clearly understood how the flow processes according to the instant invention are utilized so that one skilled in the art would be able to practice the invention.

Having described our invention, it is apparent that the present invention provides a novel interactive system for promoting a more active supplement to conventional grading and standardized test scoring processes and which promotes the independent creativity of students in preparing multi media presentations which demonstrate to a better degree classroom learning and in a fashion which encourages learning. The system, process and computer writable media of the present invention furthermore assist teachers and administrators in performing their respective functions in a highly cooperative and complementary fashion.

Additional embodiments will become apparent to those skilled in the art to which it pertains without deviating from the scope of the appended claims. Such embodiments may include providing the operating program according to the present invention in a Web based Internet Home Page system which permits a user to work on the system remotely and independent of the system hardware and will further permit a created portfolio to be accessed directly through a web browser.

Other anticipated embodiments will include the ability to exchange information relevant to the method, system and computer writable media of the invention between federal, state, district and local schools and agencies and homes and to further provide statistical analysis and feedback at every level. Also, for purposes of gearing the method and system of the invention to special education needs, such additional input features as touch screens, voice prompts, speech recognition, and text to speech conversion devices can be incorporated to facilitate use for anyone and specifically children, physically challenged individuals and others. An additional feature of portfolio generation by the student is the ability of the invention to permit the student or user to customize the look and feel, contents and navigation of the generated portfolio.

Finally, other derivative systems are envisioned which incorporate the inventive concept of the previously disclosed invention, such systems including professional office management systems, personal portfolio management systems, sports portfolio management systems, curriculum based training packages for the automotive collision industry, medical professional systems, and further application to any other profession, trade or industry which can benefit from such an interactive multi media system. Also, an embodiment is envisioned for enabling university professors to create course materials and tests for distance learning courses. Further embodiments for hotel management training systems are also envisioned.

We claim:

1. An educational method for use with an interactive audio visual system for assisting a student in preparing a multimedia presentation which is demonstrative of classroom learning, said method comprising the steps of:

creating an instructional performance task relevant to a selected educational topic;

assigning said instructional performance task in a computer readable media which is accessible by the student;

creating a student workfolder of multi media components selected from a group including a software based word processing program, a document scanner, a digital camera, a video camcorder and an audio reorder in response to said instructional performance task;

preparing a presentation by a student relevant to said performance task which is incorporated into said student workfolder, said presentation drawing from a combination of said multi media components and selected from a group including textual, audio and visual sources; and reviewing and evaluating said student workfolder and presentation and providing feedback utilizing at least one of said media components drawn from said group of textual, audio and visual media.

2. The educational method according to claim 1, further comprising the step of establishing a performance task list of said instructional performance tasks which subdivides a plurality of educational topics by school grade.

3. The educational method according to claim 2, further comprising the step of establishing an individualized task template for each of said instructional performance tasks and said workfolders.

4. The educational method according to claim 1, further comprising the step of establishing a list of exemplars of desirable work for each of said instructional performance tasks.

5. The educational method according to claim 1, further comprising the step of establishing a list of rubrics for establishing a set of scoring guidelines for evaluating said presentations for each of said instructional performance tasks.

6. The educational method according to claim 1, further comprising the step of establishing a list of state standards, district goals and course curriculum goals for each of said instructional performance tasks.

7. The educational method according to claim 1, further comprising the steps of exporting and importing said presentations from a base operating system to at least one remote operating system.

8. The educational method according to claim 1, further comprising the step of establishing a multi media portfolio which comprises a desired selection of a plurality of said presentations.

9. An educational system for use with an interactive audio visual system for assisting a student in preparing a multi media presentation which is demonstrative of classroom learning, said educational system comprising:

a computer readable media embodying a program and a workstation having a program operating platform within which said program is installed;

said program including an instructional and assignable performance task relevant to a selected educational topic and a student workfolder of multi media components selected from a group including a software based word processing program, a document scanner, a digital camera, a video camcorder and an audio recorder for receiving said performance task;

presentation means associated with said student workfolder for creating a multi media presentation relevant to said performance task;

said presentation means drawing from a combination of said multi media components ad selected from a group of textual, audio and visual sources; and means for reviewing and evaluating said presentation means and providing feedback utilizing at least one of said multi media components drawn from said group of textual, audio and visual media.

10. The educational system according to claim 9, said program further comprising a computer software code installed in a hard drive of said computer readable media.

11. The educational system according to claim 9, further comprising a digital student portfolio which incorporates a preferred selection of a plurality of said multi media presentations.

12. The educational system according to claim 11, further comprising a CD Rom upon which said digital student portfolio is stored.

13. The educational system according to claim 9, said computer readable media further comprising a network of connected personal computers, including a server computer and a network of work station computers.

14. The educational system according to claim 13, further comprising means for exporting said assignable performance tasks and said workfolders from said network to a remote located personal computer for purposes of completing an assignment and means for importing said presentations from said remote located personal computer to said network.

15. The educational system according to claim 14, said means for exporting and said means for importing further comprising a telephone modem connection establishing a communication line between said network and said remote located personal computer.

16. The educational system according to claim 9, said group of multi media sources further comprising an Internet access connection and means for downloading selected files to a library within said student workfolders.

17. A software program embodying a computer code for use with an audio and visual computer readable media for assisting a student in preparing a multi media presentation which is demonstrative of classroom learning, said program comprising:

- a first subroutine for an instructional and assignable performance task created by an instructor;
- a second subroutine for establishing a student workfolder of multi media components selected from a group including a software based word processing program, a document scanner, a distal camera, aside camcorder and an audio recorder responsive to said performance task;
- a third subroutine incorporating readable means for inputting at least one of said multi media components from a group including textual, audio and visual sources into said student work folder for use in the creation of a presentation by the student; and
- a fourth subroutine for reviewing and evaluating said presentation and for providing feedback utilizing at least one of said multi media components and selected from said group of textual, audio and visual media.

18. The program according to claim 17, said program being installed upon a CD Rom.

19. The program according to claim 17, a plurality of said multi media presentations capable of being stored upon a CD Rom.

* * * * *